United States Patent
Terao et al.

(10) Patent No.: US 7,085,382 B2
(45) Date of Patent: Aug. 1, 2006

(54) COMMUNICATION DEVICE, COMMUNICATION DEVICE SET, AUTHENTICATION METHOD AND METHOD OF WIRELESS-CONNECTING TERMINALS

(75) Inventors: Masayuki Terao, Tokyo (JP); Akira Sakai, Tokyo (JP); Masakatsu Takizawa, Tokyo (JP); Shuuji Yamaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 888 days.

(21) Appl. No.: 09/745,808

(22) Filed: Dec. 26, 2000

(65) Prior Publication Data

US 2001/0005682 A1    Jun. 28, 2001

(30) Foreign Application Priority Data

Dec. 27, 1999    (JP)    ................................. 11-369706

(51) Int. Cl.
*H04K 1/00*    (2006.01)
(52) U.S. Cl. ...................... 380/247; 713/168; 713/169; 713/170; 713/171; 713/172; 713/176; 380/268; 380/270; 380/273; 380/283; 380/284; 380/285; 726/3; 726/30; 709/216; 709/217; 709/218; 709/219; 709/220; 709/221; 709/222; 455/410; 455/411; 455/550
(58) Field of Classification Search ........ 713/200–202, 713/176, 168–172; 380/247–249, 268, 270, 380/273, 283–285; 726/3, 30; 709/216–222; 455/410–411, 550
See application file for complete search history.

(56) References Cited

U.S. PATENT DOCUMENTS

| 5,434,918 | A | * | 7/1995 | Kung et al. .................. 713/169 |
| 5,729,537 | A | * | 3/1998 | Billstrom .................... 370/329 |
| 5,884,047 | A | * | 3/1999 | Aikawa et al. ............. 709/238 |
| 5,960,085 | A | * | 9/1999 | de la Huerga ............. 340/5.61 |
| 6,006,100 | A | * | 12/1999 | Koenck et al. ............. 455/466 |
| 6,178,506 | B1 | * | 1/2001 | Quick, Jr. .................... 713/168 |
| 6,243,578 | B1 | * | 6/2001 | Koike ......................... 455/557 |
| 6,557,104 | B1 | * | 4/2003 | Vu et al. ..................... 713/189 |
| 2001/0011308 | A1 | * | 8/2001 | Clark et al. .................. 710/20 |

FOREIGN PATENT DOCUMENTS

| JP | 729694 | | 2/1995 |
| JP | 7-29694 | * | 6/1995 |
| JP | 07-327089 | * | 12/1995 |
| JP | 7327089 | | 12/1995 |
| JP | 08-149035 | | 6/1996 |
| JP | 08-321791 | | 12/1996 |
| JP | 1117790 | | 1/1999 |
| JP | 11-154886 | | 6/1999 |

* cited by examiner

*Primary Examiner*—Ayaz Sheikh
*Assistant Examiner*—Longbit Chai
(74) *Attorney, Agent, or Firm*—Sughrue Mion, PLLC

(57) ABSTRACT

A communication device which can be freely inserted into and extracted from a slot of a terminal device has its part exposed from the terminal device when inserted into the slot applied a color according to a kind of the communication device and includes a radio unit adapted to a predetermined mobile communication service, applied a color according to a kind of the mobile communication service and storing information necessary for the connection to a specific provider.

3 Claims, 29 Drawing Sheets

| COMMUNICATION DEVICE NUMBER | COMMUNICATION ADDRESS | KEY |
|---|---|---|
| 1 | COMMUNICATION ADDRESS OF COMMUNICATION DEVICE 3a | COMMON KEY K |

(b)

| COMMUNICATION DEVICE NUMBER | COMMUNICATION ADDRESS | KEY |
|---|---|---|
| 2 | COMMUNICATION ADDRESS OF COMMUNICATION DEVICE 3b | COMMON KEY K |
| 3 | COMMUNICATION ADDRESS OF COMMUNICATION DEVICE 3c | COMMON KEY K |

(c)

TRANSMISSION DESTINATION?

NUMBER  2

NUMBER  3

FIG.10

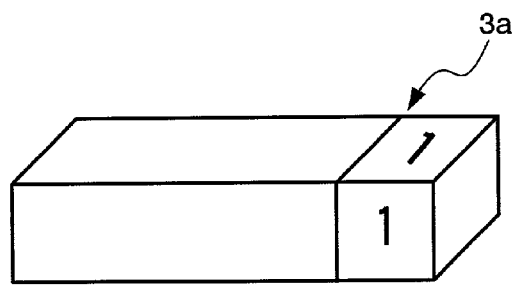

COMMUNICATION ADDRESS OF
OWN COMMUNICATION DEVICE 3a

SECRET KEY OF
OWN COMMUNICATION DEVICE 3a

PUBLIC KEY OF
OWN COMMUNICATION DEVICE 3a

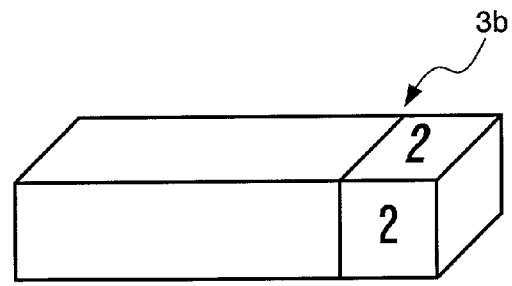

COMMUNICATION ADDRESS OF
OWN COMMUNICATION DEVICE 3b

SECRET KEY OF
OWN COMMUNICATION DEVICE 3b

PUBLIC KEY OF
OWN COMMUNICATION DEVICE 3b

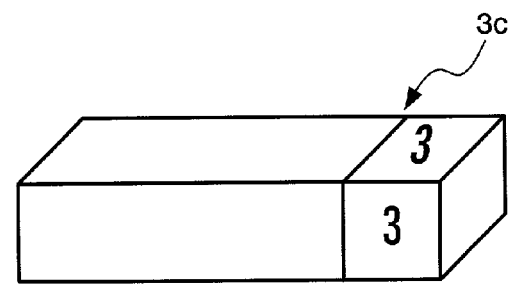

COMMUNICATION ADDRESS OF
OWN COMMUNICATION DEVICE 3c

SECRET KEY OF
OWN COMMUNICATION DEVICE 3c

PUBLIC KEY OF
OWN COMMUNICATION DEVICE 3c

FIG.19
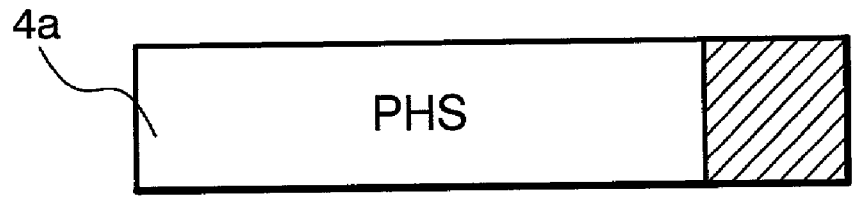
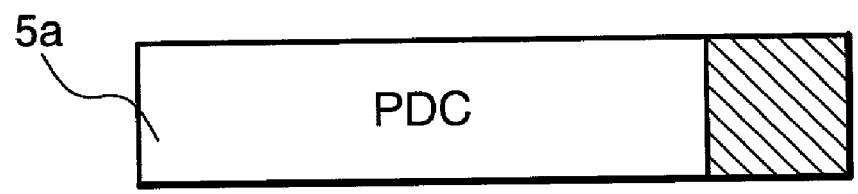
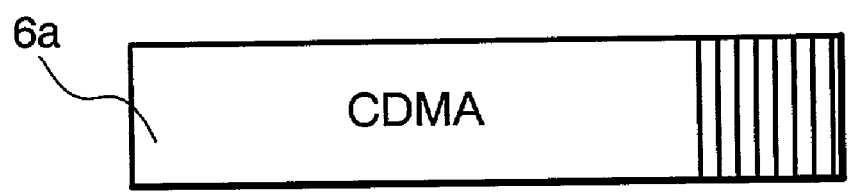
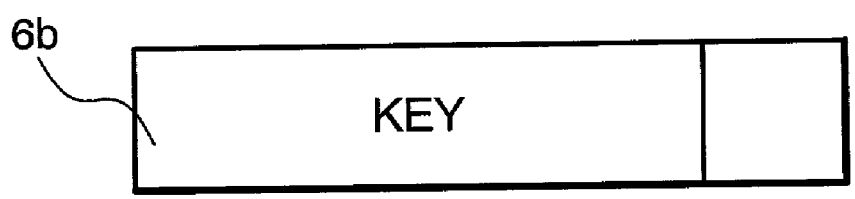

FIG.28
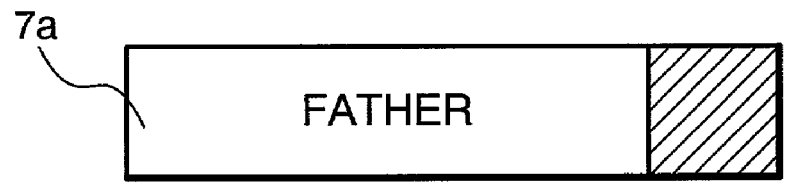
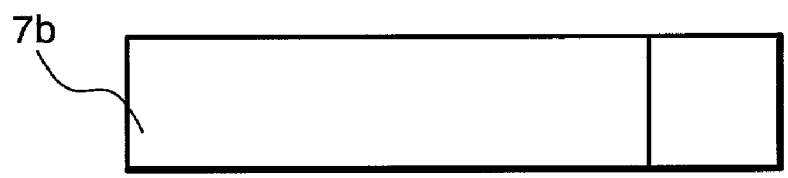
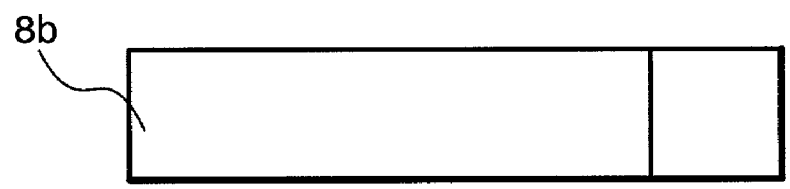
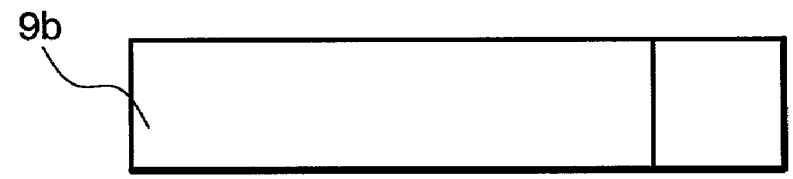

COMMUNICATION DEVICE, COMMUNICATION DEVICE SET, AUTHENTICATION METHOD AND METHOD OF WIRELESS-CONNECTING TERMINALS

BACKGROUND OF THE INVENTION

1. Field of the Invention

The present invention relates to a communication device which can be freely inserted into and extracted from a terminal device, and an authentication method between a communication device and a terminal device and a method of wireless-connecting terminals using a communication device.

2. Description of the Related Art

Various communication devices which can be freely inserted into and extracted from a terminal device have been conventionally proposed. For example, Japanese Patent Laying-Open (Kokai) No. Heisei 8-149035 (hereinafter referred to as Literature 1) proposes a card-type radio communication device which has a means for providing the interface with an information terminal, an antenna and a radio transmission and reception circuit and which is inserted for use into a PCMCIA (Personal Computer Memory Card International Association) standard slot of an information terminal. Literature 1 also discloses a technique of preventing false use of a card-type radio communication device by others by providing the card-type radio communication device with a portion to which an authentication module assigned to an individual user of a GSM (Global System for Mobile Communication) system is attached, inputting a password number by a user when the card-type radio communication device mounted with the authentication module is inserted into an information terminal and collating the input password number and a password number set at the authentication module in advance.

Among other communication devices which can be freely inserted into and extracted from a PCMCIA standard slot are a data communication radio transceiver recited in Japanese Patent Laying-Open (Kokai) No. Heisei 8-321791 (hereinafter referred to as Literature 2) and a radio terminal recited in Japanese Patent Laying-Open (Kokai) No. Heisei 11-154886 (hereinafter referred to as Literature 3).

Although as a communication device which can be freely inserted into and extracted from a terminal device, various devices have been conventionally proposed as recited in Literatures 1 to 3, they have the following shortcomings.

(1) Common mobile communication services include various systems such as a GSM system, a CDMA (Code Division Multiple Access) system, a PDC (Personal Digital Cellular) system and a PHS (Personal Handyphone System) system. Therefore, in order to cope with a wide variety of radio infrastructures, it is necessary to prepare a communication device adapted to each mobile communication service and replace the communication device by other device for use. The problem in this case is that a user is not allowed to immediately know to which mobile communication service the currently used communication device is adapted. The reason is that since the devices recited in the above Literatures 1 to 3 are premised on a specific mobile communication service as a mobile communication service, they are not designed to make a user know a kind of communication device.

(2) Although the card-type radio communication device recited in Literature 1 uses a password number for preventing false use by others, for that reason the user needs to input a password number every time the card-type radio communication device is attached to a different terminal device, which hinders facility of the device.

(3) Conventional communication devices of this kind are premised on that they are used for mobile communication services. Therefore, when a user inserts a communication device into each of such terminals as a PDA (Personal Digital Assistant), a portable phone and a personal computer (PC) each user owns to communicate between communication devices, thereby wireless-connecting a plurality of terminals, a mobile communication service should be used for every communication to incur charges and make high-speed communication difficult. Although there is a radio LAN system as a technique of locally connecting terminal devices, because the system is large in scale and requires special knowledge for setting a communication address, its home use can not be realized with ease.

SUMMARY OF THE INVENTION

An object of the present invention, taking the above-described conditions into consideration, is to enable a user to recognize with ease which communication device is currently used.

Another object of the present invention is to reduce the amount of work necessary for preventing false use of a communication device by others.

A further object of the present invention is to provide wireless connection between terminal devices with ease.

According to the first aspect of the invention, a communication device which can be freely inserted into and extracted from a slot of a terminal device, wherein a part of the communication device exposed from the terminal device when inserted into the slot is applied a color according to a kind of the communication device.

As a result, even at a state where a communication device is being inserted into a slot, it is possible to externally and instantly recognize for which mobile communication service the communication device serves. While applicable mobile communication services are, for example, a PHS system, a PDC system and a CDMA system, they are not limited thereto.

In the preferred construction, the communication device comprises a radio unit adapted to a predetermined mobile communication service and applied a color according to a kind of the mobile communication service.

In another preferred construction, the communication device comprises a radio unit adapted to a predetermined mobile communication service and applied a color according to a kind of the mobile communication service in which part information necessary for the connection to a specific provider is stored.

In another preferred construction, the communication device being a communication device to wireless-connect terminal devices and applied the color according a transmission rate.

According to the second aspect of the invention, a set of a plurality of communication devices which can be freely inserted into and extracted from a slot of a terminal device and have radio units adapted to different mobile communication services, wherein a part of the communication device exposed from the terminal device when inserted into the slot is applied a different color for each communication device.

According to the third aspect of the invention, a method of conducting authentication between a communication device which can be freely inserted into and extracted from a slot of a terminal device and the terminal device, comprising the steps of:

(a) inserting a key module storing the same ID as an ID stored in the communication device into the slot to register the ID stored in the key module at the terminal device, and (b) conducting collation between the terminal device and the communication device inserted into the slot to determine whether the ID stored in the communication device and the ID registered at the terminal device coincide with each other.

According to an authentication method of the present invention, once an ID is registered, it is unnecessary to carry a key module. At the time of using a communication device by inserting the same into a slot of a terminal device, determination is made by the terminal device and the communication device whether an ID stored in the communication device and an ID registered at the terminal device coincide with each other. It is unnecessary for a user to input a password each time as is necessary in a conventional method, whereby the amount of work by a user is reduced. In addition, since registration needs a key module without fail, more safety than that by password input is attained.

In the preferred construction, the authentication method further comprising the step of, when the communication device is extracted from the slot after authentication between the terminal device and the communication device is obtained, bringing the terminal device to a locked state where none of input by a user is accepted.

In another preferred construction, the authentication method further comprising the steps of:

when the communication device is extracted from the slot after authentication between the terminal device and the communication device is obtained, bringing the terminal device to a locked state where none of input by a user is accepted, and when the communication device is inserted into the slot of the locked terminal device to obtain authentication between the terminal device and the communication device, releasing the terminal device from the locked state.

According to a further aspect of the invention, a method of conducting authentication between a communication device which can be freely inserted into and extracted from a slot of a terminal device and the terminal device, comprising the steps of:

(a) inserting a key module storing the same ID and authentication code as an ID and an authentication code stored in the communication device and storing a cryptographic function paired with an inverse cryptographic function stored in the communication device into the slot to register the ID, the authentication code and the cryptographic function stored in the key module at the terminal device, and (b) when the communication device is inserted into the slot, conducting authentication between the communication device and the terminal device, the step (b) including:

(b-1) collating the ID stored in the communication device and the ID registered at the terminal device, (b-2) when collation of IDs succeeds, generating a random number, sending data obtained by encrypting the random number with the authentication code connected by the cryptographic function from the terminal device to the communication device and at the communication device side, restoring the authentication code and the random number by the inverse cryptographic function to collate the restored authentication code and the stored authentication code, and (b-3) when collation of authentication codes succeeds, sending data obtained by encrypting the restored random number by the inverse cryptographic function from the communication device to the terminal device and at the terminal device, restoring the random number by the cryptographic function to collate the restored random number with the random number generated by the own terminal device.

Thus introducing random numbers prevents transfer data from being unique at the time of authentication, thereby realizing reliable authentication against a malicious third party. More stringent authentication with each other is therefore possible than that realized by collation using only coincidence in IDs.

In the preferred construction, the authentication method further comprising the step of, when the communication device is extracted from the slot after authentication between the terminal device and the communication device is obtained, bringing the terminal device to a locked state where none of input by a user is accepted.

In another preferred construction, the authentication method further comprising the steps of:

when the communication device is extracted from the slot after authentication between the terminal device and the communication device is obtained, bringing the terminal device to a locked state where none of input by a user is accepted, and when the communication device is inserted into the slot of the locked terminal device to obtain authentication between the terminal device and the communication device, releasing the terminal device from the locked state.

According to a further aspect of the invention, a set of a plurality of communication devices which can be freely inserted into and extracted from a slot of a terminal device to wireless-connect terminal devices, wherein each communication device includes a memory readable by the terminal device and storing a communication address of the own communication device and a communication address of other communication device of the same set.

Users are released from the work of setting a communication address and in addition, because a key for use in transmitting and receiving encrypted data is set in advance, the users do not need to set a key by themselves.

In the preferred construction, a common key for data encryption is stored in the memory of each communication device.

In another preferred construction, in the memory of each communication device, a secret key of the own communication device and a public key of other communication device of the same set are stored.

In another preferred construction, a part of the communication device partly projecting from the terminal device when inserted into the slot of the terminal device is assigned a number inherent to the communication device and the communication address of the communication device is composed of a high-order address part and a low-order address part in which part the number is set.

According to a further aspect of the invention, a set of a plurality of communication devices which can be freely inserted into and extracted from a slot of a terminal device to wireless-connect terminal devices, wherein each communication device includes a memory readable by the terminal device and storing a communication address of the own communication device and a common key for data encryption inherent to the set.

In the preferred construction, a part of the communication device partly projecting from the terminal device when inserted into the slot of the terminal device is assigned a number inherent to the communication device and the communication address of the communication device is composed of a high-order address part and a low-order address part in which part the number is set.

According to a further aspect of the invention, a set of a plurality of communication devices which can be freely inserted into and extracted from a slot of a terminal device to wireless-connect terminal devices, wherein each communication device includes a memory readable by the terminal device and storing a communication address of the own communication device, a public key for data encryption and a secret key for data decoding.

In the preferred construction, a part of the communication device partly projecting from the terminal device when inserted into the slot of the terminal device is assigned a number inherent to the communication device and the communication address of the communication device is composed of a high-order address part and a low-order address part in which part the number is set.

According to a further aspect of the invention, a method of locally wireless-connecting a plurality of terminal devices by using a set of a plurality of communication devices which can be freely inserted into and extracted from a slot of the terminal device to wireless-connect the terminal devices and which have a memory for storing a communication address of the own communication device, comprising the steps of:

(a) allocating a communication device to each of the terminal devices to be wireless-connected, (b) inserting each communication device into a slot of other terminal device than the allocated terminal device to register a communication address stored in the memory of the communication device at a transmission destination list table of the terminal device into which the communication device is inserted, (c) inserting each communication device into a slot of an allocated terminal device, and (d) by using communication addresses of a transmission destination communication device and a transmission source communication device as a transmission destination address and a transmission source address, transmitting and receiving data between the terminal devices into which the communication devices are inserted.

In the preferred construction, in the memory of each communication device, a common key inherent to the set is stored, the common key being for use in encryption of transmission data and decoding of reception data.

In another preferred construction, into one slot of a relay device having a plurality of slots and having a function of relaying data between slots, a communication device of a first set is inserted and into other one slot, a communication device of a second set is inserted to enable communication between a terminal device into which other communication device of the first set is inserted and a terminal device into which other communication device of the second set is inserted through the relay device.

In another preferred construction, a part of the communication device partly projecting from the terminal device when inserted into the slot of the terminal device is assigned a number inherent to the communication device and the communication address of the communication device is composed of a high-order address part and a low-order address part in which part the number is set.

In another preferred construction, part of the communication device partly projecting from the terminal device when inserted into the slot of the terminal device is assigned a number inherent to the communication device and the communication address of the communication device is composed of a high-order address part and a low-order address part in which part the number is set.

According to a further aspect of the invention, a method of locally wireless-connecting a plurality of terminal devices by using a set of a plurality of communication devices which can be freely inserted into and extracted from a slot of the terminal device to wireless-connect the terminal devices and which have a memory for storing a communication address, a public key and a secret key of the own communication device, comprising the steps of:

(a) allocating a communication device to each of the terminal devices to be wireless-connected, (b) inserting each communication device into a slot of other terminal device than the allocated terminal device to register a communication address and a public key stored in the communication device at a transmission destination list table of the terminal device into which the communication device is inserted, (c) inserting each communication device into a slot of an allocated terminal device, and (d) by using communication addresses of a transmission destination communication device and a transmission source communication device as a transmission destination address and a transmission source address, using a public key of the transmission destination communication device for the encryption of transmission data and using a secret key for the decoding of reception data, transmitting and receiving data between the terminal devices into which the communication devices are inserted.

In the preferred construction, a part of the communication device partly projecting from the terminal device when inserted into the slot of the terminal device is assigned a number inherent to the communication device and the communication address of the communication device is composed of a high-order address part and a low-order address part in which part the number is set.

In another preferred construction, a part of the communication device partly projecting from the terminal device when inserted into the slot of the terminal device is assigned a number inherent to the communication device and the communication address of the communication device is composed of a high-order address part and a low-order address part in which part the number is set.

According to a further aspect of the invention, a method of locally wireless-connecting a plurality of terminal devices by using a set of a plurality of communication devices which can be freely inserted into and extracted from a slot of the terminal device to wireless-connect the terminal devices and which have a memory for storing a communication address of the own communication device, comprising the steps of:

(a) allocating a communication device to each of the terminal devices to be wireless-connected, (b) into a slot of a specific terminal device, sequentially inserting communication devices allocated to other terminal devices to register communication addresses stored in the communication device at a transmission destination list table of the specific terminal device, (c) inserting each communication device into a slot of an allocated terminal device, (d) sequentially transmitting from the specific terminal device to other terminal devices, the contents of the transmission destination list table in which a communication address part of the current transmission destination communication device is replaced by the communication address stored in the communication device inserted into the specific terminal device, and each terminal device at the reception side, setting the contents of the received transmission destination list table at a transmission destination list table of the own device, and (e) transmitting and receiving data between the terminal devices into which the communication devices are inserted by using communication addresses of a transmission destination communication device and a transmission source communication device as a transmission destination address and a transmission source address.

The above-described method is suitable for wireless-connecting as few terminal devices as two or three. However, as the number of terminal devices to be wireless-connected is increased, the number of times of insertions of the communication device into a slot is increased to increase the amount of work to be done by a user. The following method enables the amount of the work by a user to be suppressed even if the number of terminal devices is increased.

In the preferred construction, in the memory of each communication device, a common key inherent to the set is stored, the common key being for use in encryption of transmission data and decoding of reception data.

In another preferred construction, into one slot of a relay device having a plurality of slots and having a function of relaying data between slots, a communication device of a first set is inserted and into other one slot, a communication device of a second set is inserted to enable communication between a terminal device into which other communication device of the first set is inserted and a terminal device into which other communication device of the second set is inserted through the relay device.

In another preferred construction, a part of the communication device partly projecting from the terminal device when inserted into the slot of the terminal device is assigned a number inherent to the communication device and the communication address of the communication device is composed of a high-order address part and a low-order address part in which part the number is set.

In another preferred construction, a part of the communication device partly projecting from the terminal device when inserted into the slot of the terminal device is assigned a number inherent to the communication device and the communication address of the communication device is composed of a high-order address part and a low-order address part in which part the number is set.

According to a further aspect of the invention, a method of locally wireless-connecting a plurality of terminal devices by using a set of a plurality of communication devices which can be freely inserted into and extracted from a slot of the terminal device to wireless-connect the terminal devices and which have a memory for storing a communication address, a public key and a secret key of the own communication device, comprising the steps of:

(a) allocating a communication device to each of the terminal devices to be wireless-connected, (b) into a slot of a specific terminal device, sequentially inserting communication devices allotted to other terminal devices to register communication addresses and public keys stored in the communication devices at a transmission destination list table of the specific terminal device, (c) inserting each communication device into a slot of an allocated terminal device, (d) sequentially transmitting from the specific terminal device to other terminal devices, the contents of the transmission destination list table in which parts of a communication address and a public key of the current transmission destination communication device are replaced by the communication address and the public key stored in the communication device inserted into the specific terminal device and at the reception side terminal device, setting the contents of the received transmission destination list table at a transmission destination list table of the own device, and (e) transmitting and receiving data between the terminal devices into which the communication devices are inserted by using communication addresses of a transmission destination communication device and a transmission source communication device as a transmission destination address and a transmission source address, using a public key of the transmission destination communication device for encrypting transmission data and using a secret key for decoding reception data.

In the preferred construction, a part of the communication device partly projecting from the terminal device when inserted into the slot of the terminal device is assigned a number inherent to the communication device and the communication address of the communication device is composed of a high-order address part and a low-order address part in which part the number is set.

As a result, a user is allowed to recognize which communication device corresponds to which communication address by comparing a value of a low-order address part of the communication address and a number assigned to the communication device.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 7 is a diagram showing an example of an own communication device information table, a transmission destination list table and a transmission destination selection screen generated by the registration processing of the communication device for wireless-connection;

FIG. 10 is a diagram showing a further example of a schematic appearance of one set of communication devices purchased by a user and storage information;

FIG. 19 is a diagram schematically showing a set of communication devices for use in a mobile communication service;

FIG. 28 is a diagram schematically showing another set of communication devices for use in a mobile communication service;

DESCRIPTION OF THE PREFERRED EMBODIMENTS

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
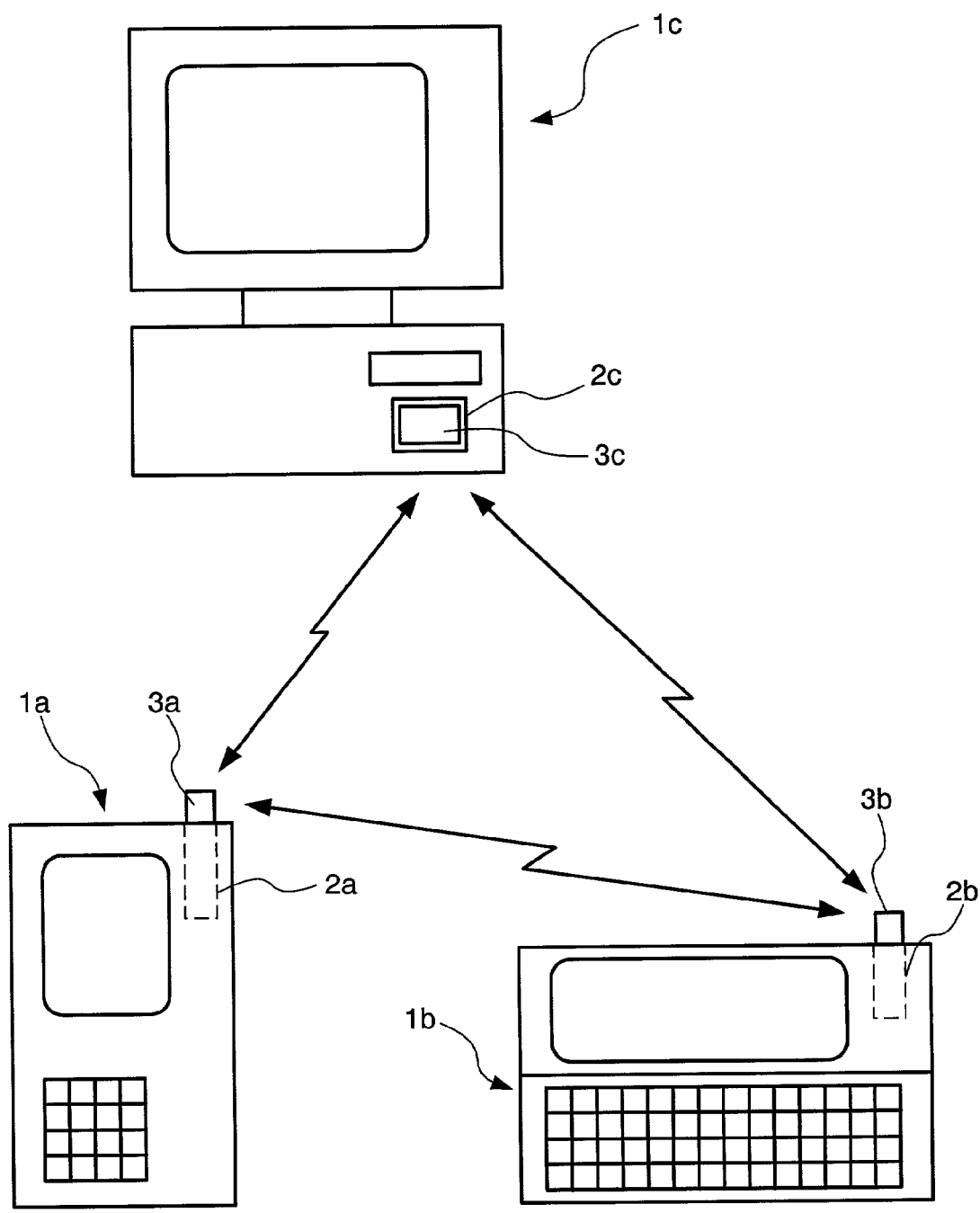
FIG. 1 is a diagram of a system structure showing one embodiment of the present invention.

With reference to FIG. 1, according to one embodiment of the present invention, three terminal devices, a portable terminal device 1a, a PDA 1b and a PC (personal computer) 1c are wireless-connected with each other by communication devices 3a, 3b and 3c inserted into slots 2a, 2b and 2c provided therein. Each of the communication devices 3a to 3c has the same configuration standardized and has the same internal structure. An example of a structure of the communication devices 3a to 3c is shown in FIG. 2.

Figure 2:
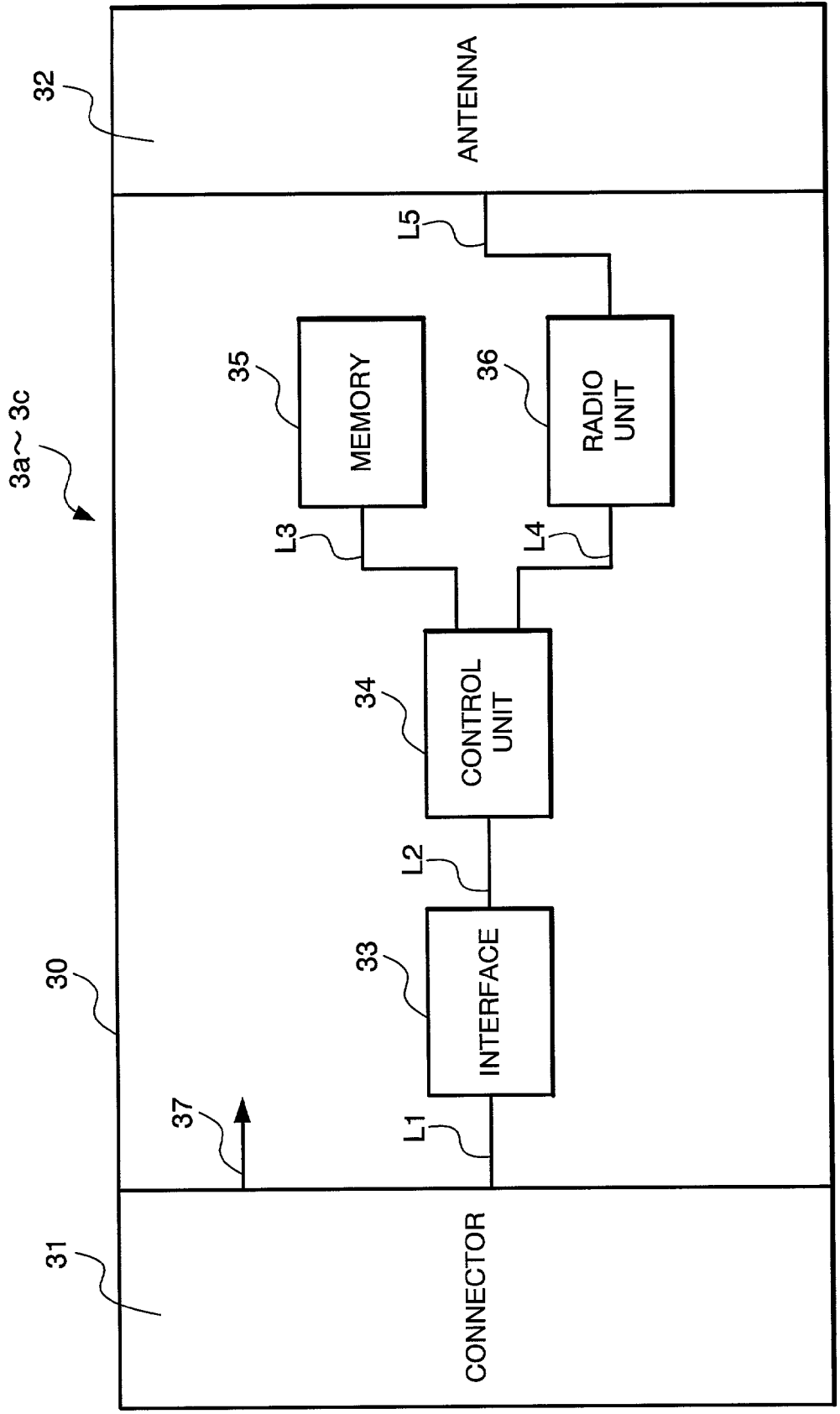
FIG. 2 is a block diagram showing an example of a structure of a communication device for wireless-connection.

With reference to FIG. 2, a connector 31 is provided at one end side of a device casing 30 to physically and electrically couple with a socket provided on the side of the communication device when the communication device is inserted into the slot. An antenna 32 is provided at the opposite end to the connector 31 to project outside the slot when the communication device is attached to the slot. The antenna 32 is structured by a small antenna such as a slot antenna. Between the connector 31 and the antenna 32, an interface 33, a control unit 34, a memory 35 and a radio unit 36 are provided. The interface 33 is connected to the connector 31 through a signal line L1, as well as to the control unit 34 through a signal line L2, the control unit 34 is connected to the memory 35 and the radio unit 36 through signal lines L3 and L4, respectively, and the radio unit 36 is connected to the antenna 32 through a signal line L5. In addition, electric power supplied from the terminal device side through the connector 31 is supplied to each unit through a power supply line 37.

The memory 35 is structured by a non-volatile memory such as a ROM to store at least a communication address of the own communication device. The communication address stored in the memory 35 is read by the control unit 34 at the time of activation of the communication device and is set at the radio unit 36 as a communication address of the own communication device. Storage information of the memory 35 is readable by the terminal device through control unit 34, the interface 33 and the connector 31.

The radio unit 36 has a function of generating, transmitting and receiving a radio frequency signal. The radio unit 36 can be realized by appropriating, for example, a radio unit of a child device in an existing radio LAN system conforming to a radio LAN standard normalized as IEEE802.1 and in this case, an arbitrary communication system such as a direct diffusion system and a frequency hopping system can be used. In addition, a radio unit for use in a blue-tooth system can be appropriated. Frequency bands for use are various types including 2.4 GHz and 4 GHz. In addition, the unit 36 may be designed to have a media access control function. In this case, a distributed control CSMA/CA (Carrier Sense Multiple Access with Collision Avoidance) can be used in which a carrier is sensed before transmission and when detecting the carrier, no transmission is conducted and re-transmission is tried after a random time.

The interface 33, together with the connector 31, constitutes an adapter adapted to a predetermined electrical or mechanical standard. As a standard, the PCMCIA standard, for example, can be adopted or other standards such as USB (Universal Serial Bus) may be used.

The control unit 34 is a part in charge of control of the entire communication device and is composed, for example, of an MPU and a ROM for storing a control program. The control unit 34 has various additional control functions in addition to the basic transmission and reception related control functions of providing control for transmitting data directed to the own communication device received at the radio unit 36 to the terminal device through the interface 33 and the connector 31 and control for transmitting transmission data transferred from the side of the terminal device through the connector 31 and the interface 33 to the radio unit 36 and causing the unit 36 to transmit the data.

Figure 3:
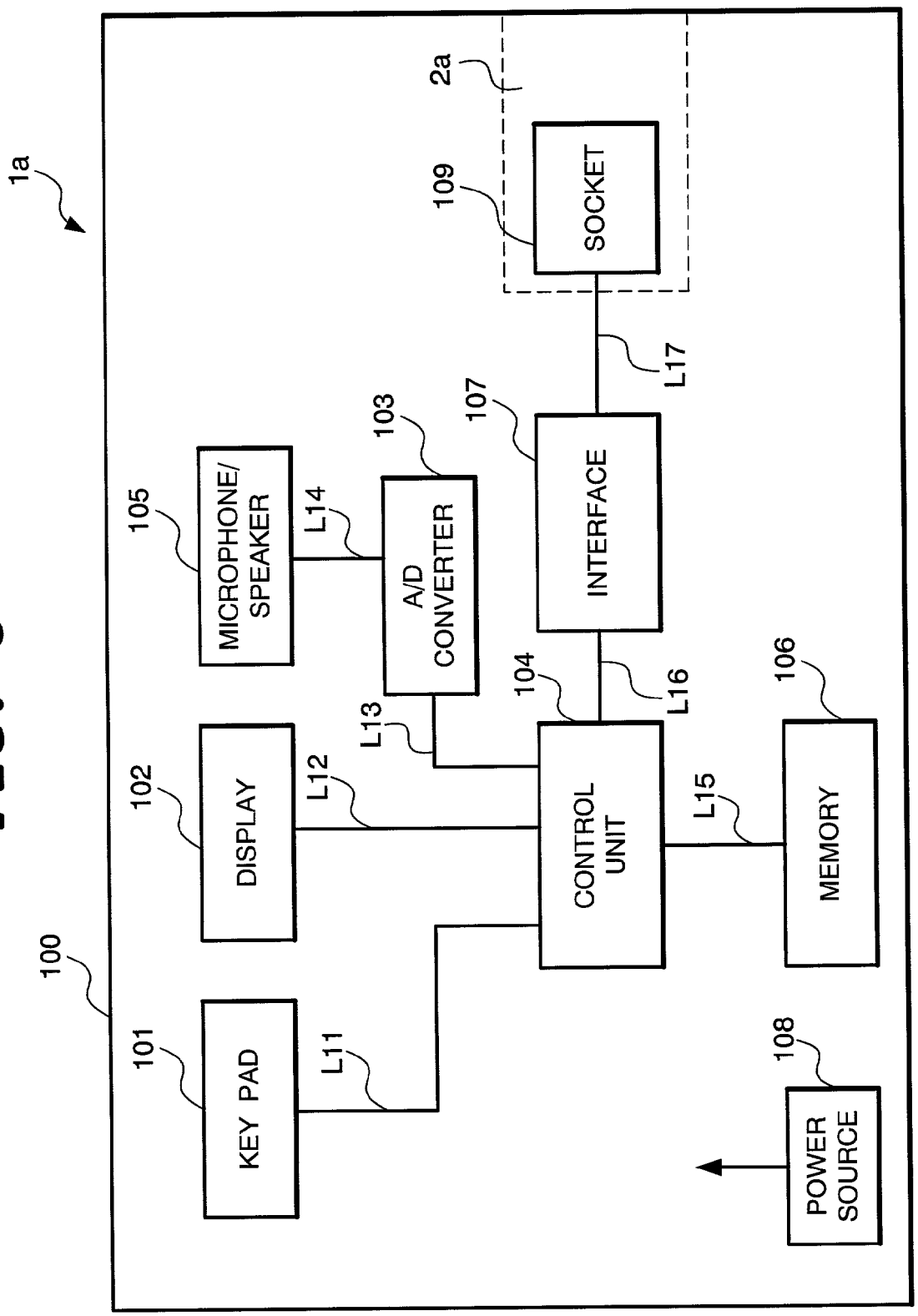
FIG. 3 is a block diagram showing an example of a structure of a portable terminal device.

An example of a structure of the portable terminal device 1a is shown in FIG. 3. With reference to FIG. 3, the portable terminal device 1a includes, in a device casing 100, a key pad 101, a display 102 such as an LCD, an A/D converter 103 for conducting conversion of a signal from analog to digital and reverse-conversion thereof, a control unit 104 connected to these units through signal lines L11 to L13, a microphone/speaker 105 connected to the A/D converter 103 by a signal line L14, a memory 106 connected to the control unit 104 through a signal line L15, an interface 107 connected to the control unit 104 through a signal line L16 and a power source 108 for supplying power to each unit, and also includes the slot 2a in which a socket 109 connected to the interface 107 through a signal line L17 is provided.

The socket 109 and the interface 107 constitute an adapter electrically or mechanically adapted to the adapter (31, 33) on the side of the communication devices 3a to 3c shown in FIG. 2. The A/D converter 103 converts an analog sound signal from the microphone into a digital sound signal and a sound signal output from the control unit 104 to the speaker from a digital signal into an analog signal. The control unit 104 has various additional functions in addition to the transmission and reception call control function that a common portable telephone has, and is composed of an MPU and a ROM for storing a control program, for example. The memory 106 is structured, for example, by a RAM and used for storing various kinds of data.

Figure 4:
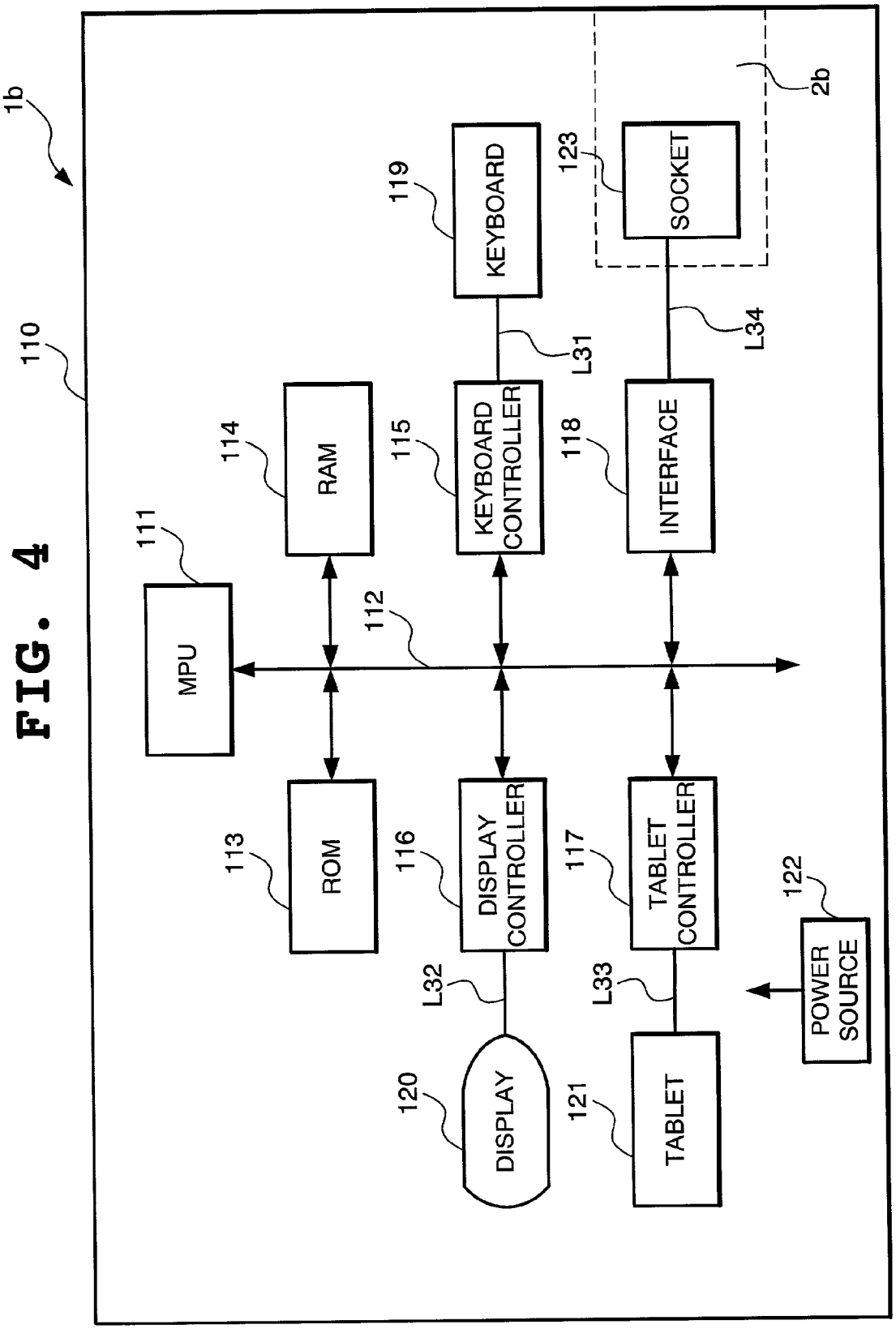
FIG. 4 is a block diagram showing an example of a structure of a PDA.

An example of a structure of the PDA 1b is shown in FIG. 4. With reference to FIG. 4, the PDA 1b includes, in a device casing 110, an MPU 111, and a ROM 113, a RAM 114, a keyboard controller 115, a display controller 116, a tablet controller 117 and an interface 118 connected to a bus 112 of the MPU 111, a keyboard 119 connected to the keyboard controller 115 through a signal line L31, a display 120 such as an LCD connected to the display controller 116 through a signal line L32, a tablet 121 connected to the tablet controller 117 through a signal line L33, and a power source 122 for supplying power to each unit, and also includes the slot 2b in which a socket 123 connected to the interface 118 through a signal line L34 is provided.

The socket 123 and the interface 118 constitute an adapter electrically or mechanically adapted to the adapter (31, 33) on the side of the communication devices 3a to 3c. The tablet 121 is arranged to cover the display surface of the display 120 and constitutes, together with the display 120 and its controllers 116 and 117, a display device having a pen input function. The MPU 111 forms a control unit in charge of control of the entire PDA 1b and the ROM 113 stores various kinds of programs to be executed at the MPU 111. The RAM 114 is used for storing various kinds of data.

The PC 1c basically has the same structure as that of the PDA 1b. In a PC not adopting the pen input system, however, the tablet 121 and the tablet controller 117 are not provided. In addition, input using a mouse is enabled in general and a commercial power source is ordinarily used as a power source.

Next, description will be made of a specific example of wireless-connection of terminal devices.

SPECIFIC EXAMPLE 1

A plurality of communication devices are sold as one set to a user. Various kinds of sets exist which differ in the number of communication devices included or differ in a transmission rate. For example, one set is made up of two communication devices having a transmission rate of 2 Mbps and the other set is made up of ten communication devices having a transmission rate of 4 Mbps. The communication device in each set has a part projecting from a slot when inserted into therein painted with a different color according to its transmission rate to enable a user to recognize the transmission rate of the communication device by the color. For example, 2 Mbps is denoted as yellow, 4 Mbps as orange, 10 Mbps as red, 16 Mbps as blue and 32 Mbps as green. The communication device does not always need to project from the slot as long as it is exposed. Communication devices in each set are assigned serial numbers starting with 1. Cost is increased as a transmission rate is increased and as the number of communication devices included in the set is increased. User determines a transmission rate and the number of communication devices to purchase a relevant set. As many communication devices as or more than the total number of terminal devices to be wireless-connected are necessary.

Figure 5:
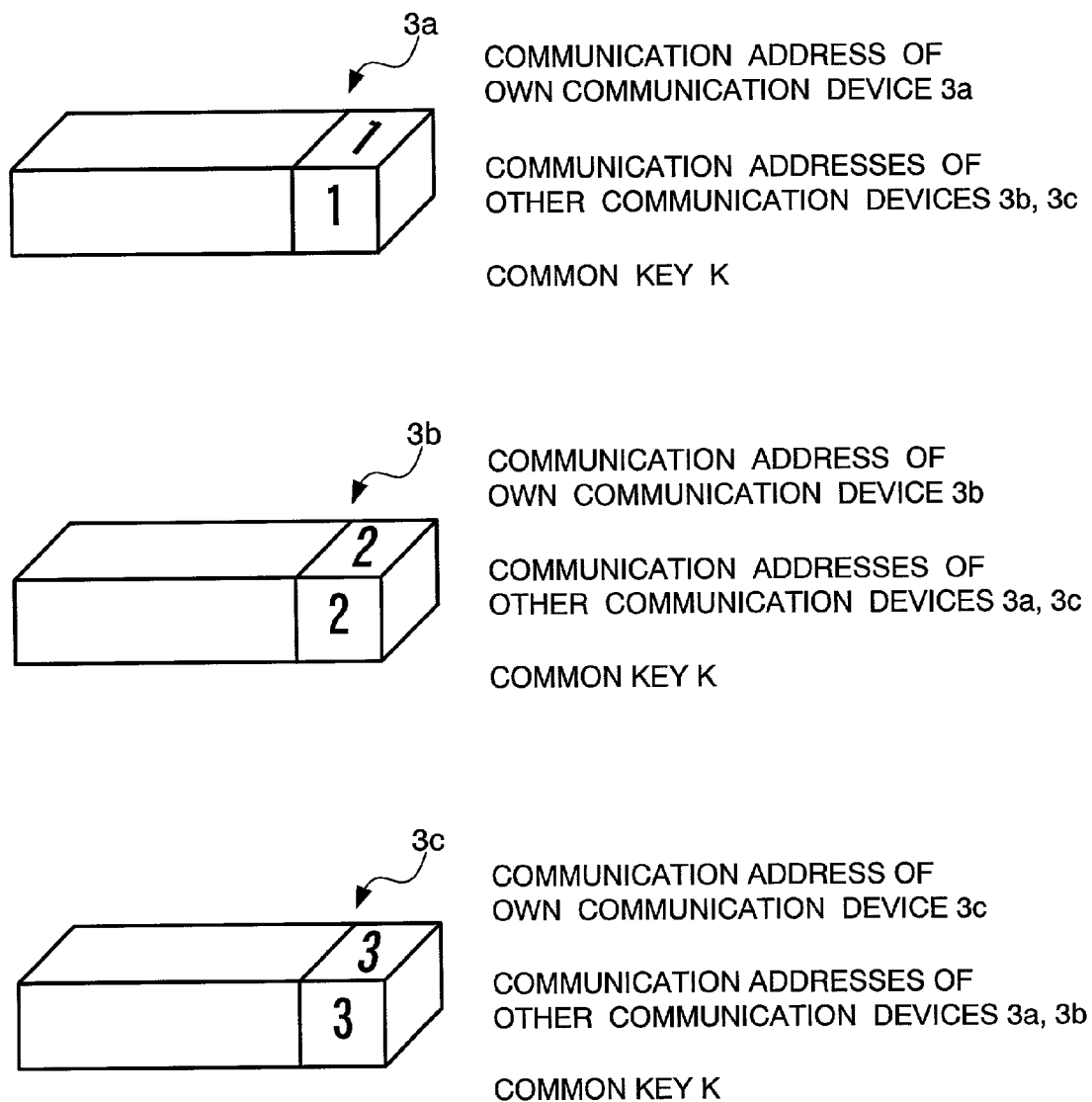
FIG. 5 is a diagram showing one example of a schematic appearance of one set of communication devices purchased by a user and storage information.

FIG. 5 schematically shows an appearance of communication devices of one set purchased by a user. In this example, one set includes three devices, with "1", "2" and "3" printed on or carved in the communication devices 3a, 3b and 3c, respectively. As to colors representing transmission rates, the numerals "1" to "3" may be colored or backgrounds of the numerals may be colored. In the latter case, the whole of the end portion may be colored or a part of the same may be colored.

In a case of the present specific example, in the memory 35 of each of the communication devices 3a to 3c, a communication address of the own communication device, a communication address of other communication device and a common key for encryption which is for use at data transmission are stored in advance as shown in FIG. 5. The communication address is composed of a high-order address part constituted by a plurality of bits and a low-order address part constituted by several bits, and at the high-order address part, addresses inherent to the relevant set are set and at the low-order address part, a numeric value of a serial number assigned to the communication device in question is set.

In a case where the three terminal devices 1a to 1c shown in FIG. 1 are wireless-connected using the three communication devices 3a to 3c shown in FIG. 5, one of the communication devices 3a to 3c is allotted to each of the terminal devices 1a to 1c to conduct each registration work. In the following, description will be made of registration work in the present specific example assuming that the communication device 3a is allotted to the terminal device 1a, the communication device 3b to the terminal device 1b and the communication device 3c to the terminal device 1c.

Figure 6:
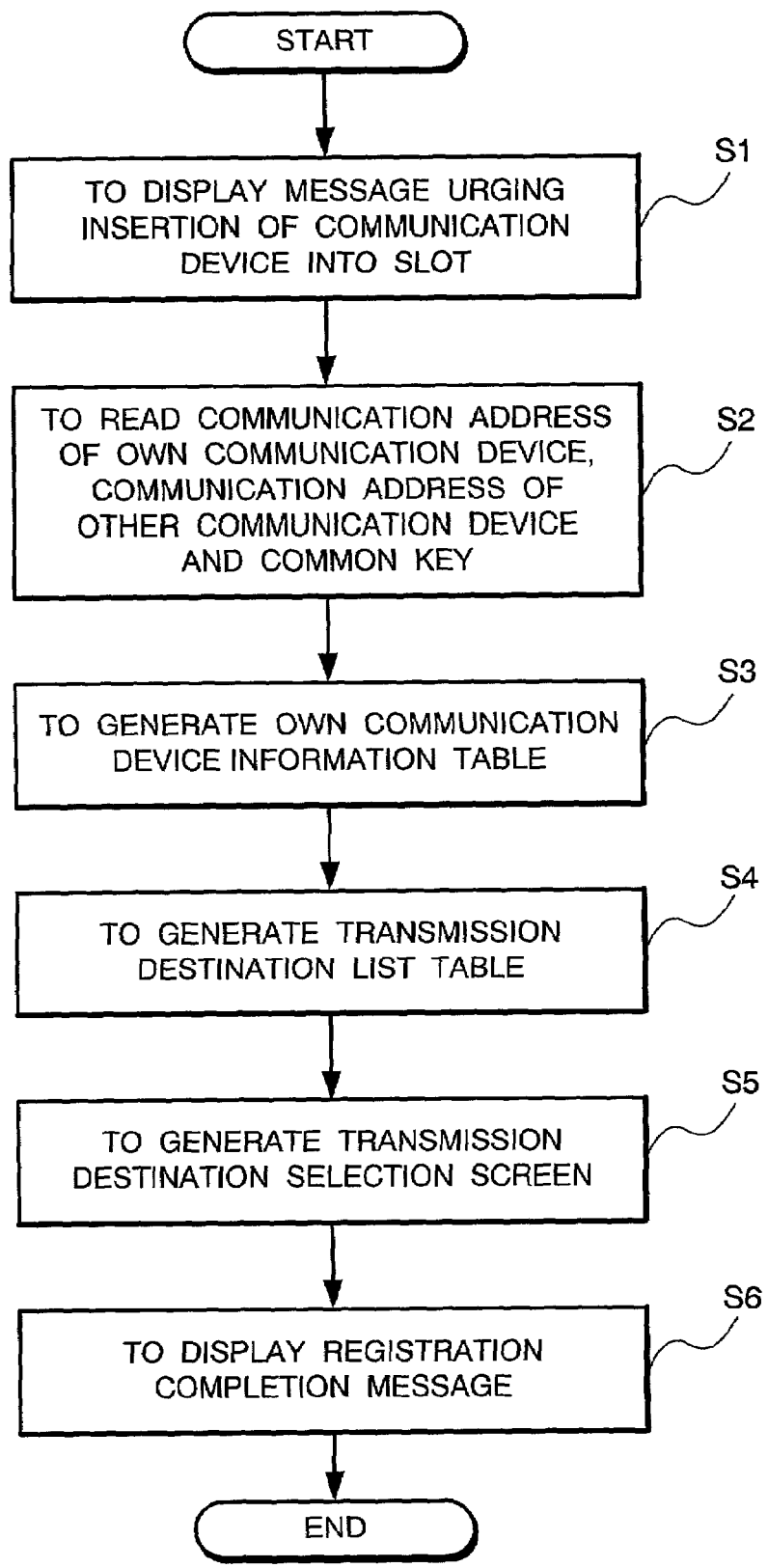
FIG. 6 is a flow chart showing a first example of processing of registering the communication device for wireless-connection at a terminal device.

When the registration processing of the communication device for wireless-connection is started by the operation of the key pad 101 of the portable terminal device 1a, the control unit 104 starts processing shown in FIG. 6. First, display such a message as "insert the communication device into the slot" at the display 102 (S1). When the user responsively inserts the communication device 3a into the slot 2a, power is supplied to the communication device 3a from the power source 108 contained in the portable terminal device 1a through the socket 109 to render the communication device 3a operable. Next, the control unit 104 reads a communication address of the own communication device 3a, communication addresses of the other communication devices 3b and 3c and a common key K stored in the memory 35 through the interface 107, the socket 109, and the connector 31, the interface 33 and the control unit 34 of the communication device 3a (S2). Then, generate an own communication device information table (S3), generate a transmission destination list table (S4), generate a transmission destination selection screen (S5) and display a registration completion message at the display 102 (S6) to finish the processing. The generated own communication device information table, transmission destination list table and transmission destination selection screen are preserved in the memory 106.

An example of the contents of the own communication device information table generated at step S3 is shown in FIG. 7(a). The own communication device information table 130 is composed of items of a communication device number, a communication address and a key. In the item of the communication address, a communication address of the own communication device 3a is set and at the communication device number, a numeric value indicated in a low-order address part of the communication address of the own communication device 3a, that is, the number 1 assigned to the communication device 3a is set. In the item of the key, the common key K is set.

An example of the contents of a transmission destination list table generated at step S4 is shown in FIG. 7(b). A transmission destination list table 131 is made up of entries for each of the other communication devices 3b and 3c and each entry includes items of a communication device number, a communication address and a key. In the item of the communication address, communication addresses of the other communication devices 3b and 3c are set. At the communication device number, numeric values indicated in low-order address parts of the communication addresses of the other communication devices 3b and 3c, that is, the numbers 2 and 3 assigned to the communication devices 3b and 3c are set. In the item of the key, the common key K is set.

The transmission destination selection screen generated at step S5 is a screen for use when a user selects a transmission destination at the time of actual transmission and an example of its contents is shown in FIG. 7(c). As illustrated in the figure, the transmission destination selection screen presents the communication device numbers 2 and 3 set at the transmission destination list table 131 to a user to make him or her select either of them.

The function of assisting such registration work as shown in FIG. 6 is also provided by the MPU 111 of each of the PDA 1b and PC 1c, in which a user repeats the same work as that for the portable terminal device 1a for the PDA 1b and PC 1c by using the communication devices 3b and 3c. As a result, at the RAM 114 of each of the PDA 1b and PC 1c, the same own communication device information table, transmission destination list table and transmission destination selection screen as those of FIG. 7 are generated. Since the communication device 3a, and the communication devices 3b and 3c are different in its own communication device and the other communication devices, the contents also differ.

When the foregoing registration work is completed, wireless transmission and reception of data is enabled among the portable terminal device 1a, the PDA 1b and the PC 1c. For example, when a certain kind of file (e.g. telephone directory file) stored in the memory 106 of the portable terminal device 1a is selected as a file to be transmitted and for example, the number 2 is selected on the transmission destination selection screen shown in FIG. 7(c) to instruct on the start of transmission by the operation of the key pad 101, the control unit 104 starts wireless transmission control. First, read the file to be transmitted from the memory 106 and encrypt the file by the common key K stored in the own communication device information table 130.

Figure 8:
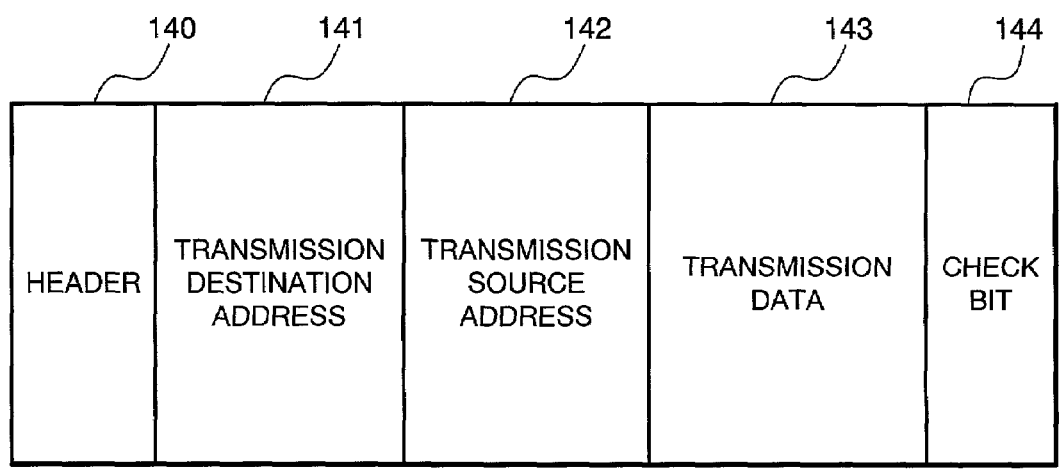
FIG. 8 is a diagram showing an example of a format of transmission data transmitted and received between communication devices for wireless-connection.

Then, generate transmission data having such a format composed of a header 140, a transmission destination address 141, a transmission source address 142, a transmission data 143 and a check bit 144 such as a parity bit of the data as shown in FIG. 8 and send the same to the communication device 3a through the interface 107. Here, the transmission destination address 141 is a communication address stored in the transmission destination list table 131 corresponding to the number selected on the transmission destination selection screen by the user and the transmission source address 142 is a communication address stored in the own communication device information table 130. The transmission data 143 is encrypted by the common key K. Upon receiving the transmission data from the side of the terminal device 1a through the interface 33, the control unit 34 of the communication device 3a sends the data to the radio unit 36, so that the radio unit 36 converts the data into a radio frequency signal and transmits the signal through the antenna 32.

The radio unit 36 in each of the communication devices 3a to 3c inserted into the respective terminal devices 1a to 1c, when the transmission destination address 141 of the data received at the antenna 32 coincides with the communication address of the own communication device, accepts the transmission data in question and transmits the same to the control unit 34. The control unit 34 sends the transmission data to the terminal device side through the interface 33. When, for example, a communication address of the communication device 1b inserted into the PDA 1b having the number 2 is set at the transmission destination address 141, data transmitted from the communication device 3a is received by the communication device 3b and sent to the PDA 1b. The MPU 111 of the PDA 1b receives the data through the interface 118 and checks the data by the check bit 144 and when no error is found, decodes the transmission data 143 by the common key set at the own communication information table. The decoded data is stored in a reception area of the RAM 114 together, for example, with its transmission source address and then a message informing the PDA 1b user of data reception is displayed on the display 120.

While the foregoing description relates to wireless transmission from the portable terminal device 1a to the PDA 1b, the same wireless transmission is possible also between other arbitrary devices such as wireless transmission from the PDA 1b to the portable terminal device 1a or to the PC 1c.

SPECIFIC EXAMPLE 2

Figure 9:
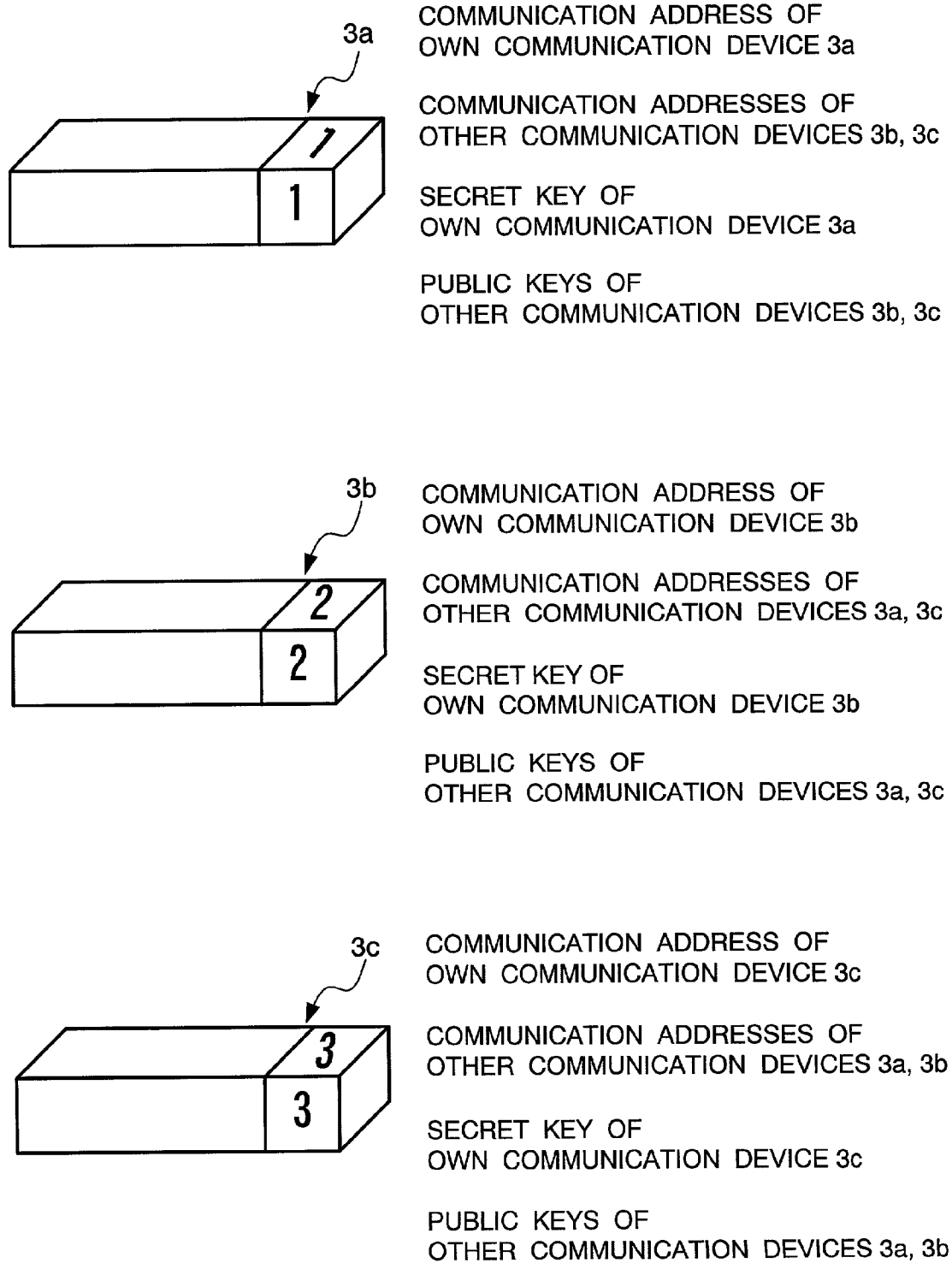
FIG. 9 is a diagram showing another example of a schematic appearance of one set of communication devices purchased by a user and storage information.

The present specific example is the same as the specific example 1 with the only difference being that as a key for encryption, a public key inherent to a communication device is used and a secret key is used for decoding the public key. FIG. 9 schematically shows an appearance of communication devices of one set purchased by a user. In this example, one set is made up of three devices, and in the memory 35 of each of the communication devices 3a to 3c, a communication address of the own communication device, a communication address of other communication device, a secret key of the own communication device and a public key of other communication device are stored in advance. For wireless-connecting the three terminal devices 1a to 1c shown in FIG. 1 using the three communication devices 3a to 3c shown in FIG. 9, the same registration work as that of the specific example 1 is conducted. At this time, at step S2 of FIG. 6, the communication addresses of the own communication device and other communication device, the secret key of the own communication device and the public key of other communication device are read to set the secret key of the own communication device in the item of the key of the own communication device information table 130 in FIG. 7 and the public key of other communication device in the item of the key of the transmission destination list table 131. A terminal device as a transmission source encrypts data using a public key of a communication device of a transmission destination terminal device and transmits the encrypted data, while the terminal device on the reception side decodes the data using a secret key of the own communication device.

SPECIFIC EXAMPLE 3

The present specific example is the same as the specific example 1 with the only difference being that as a key for encryption, a public key inherent to a communication device is used and for its decoding, a secret key is used and that each communication device stores a communication address, a public key and a secret key of the own communication device and not a communication address, a public key and a secret key of other communication device. FIG. 10 schematically shows an appearance of communication devices of one set purchased by a user. In this example, one set includes three devices, and in the memory 35 of each of the communication devices 3a to 3c, a communication address of the own communication device, a secret key and a public key of the own communication device are stored in advance.

In a case where the three terminal devices 1a to 1c shown in FIG. 1 are wireless-connected using the three communication devices 3a to 3c shown in FIG. 10, one of the communication devices 3a to 3c is allotted to each of the terminal devices 1a to 1c to conduct predetermined registration work. In the following, description will be made of registration work in the present specific example assuming that the communication device 3a is allotted to the terminal device 1a, the communication device 3b to the terminal device 1b and the communication device 3c to the terminal device 1c.

Description will be first made of the work for registering the communication addresses, the secret keys and the public keys of the own communication devices 3a to 3c at the respective terminal devices 1a to 1c.

Figure 11:
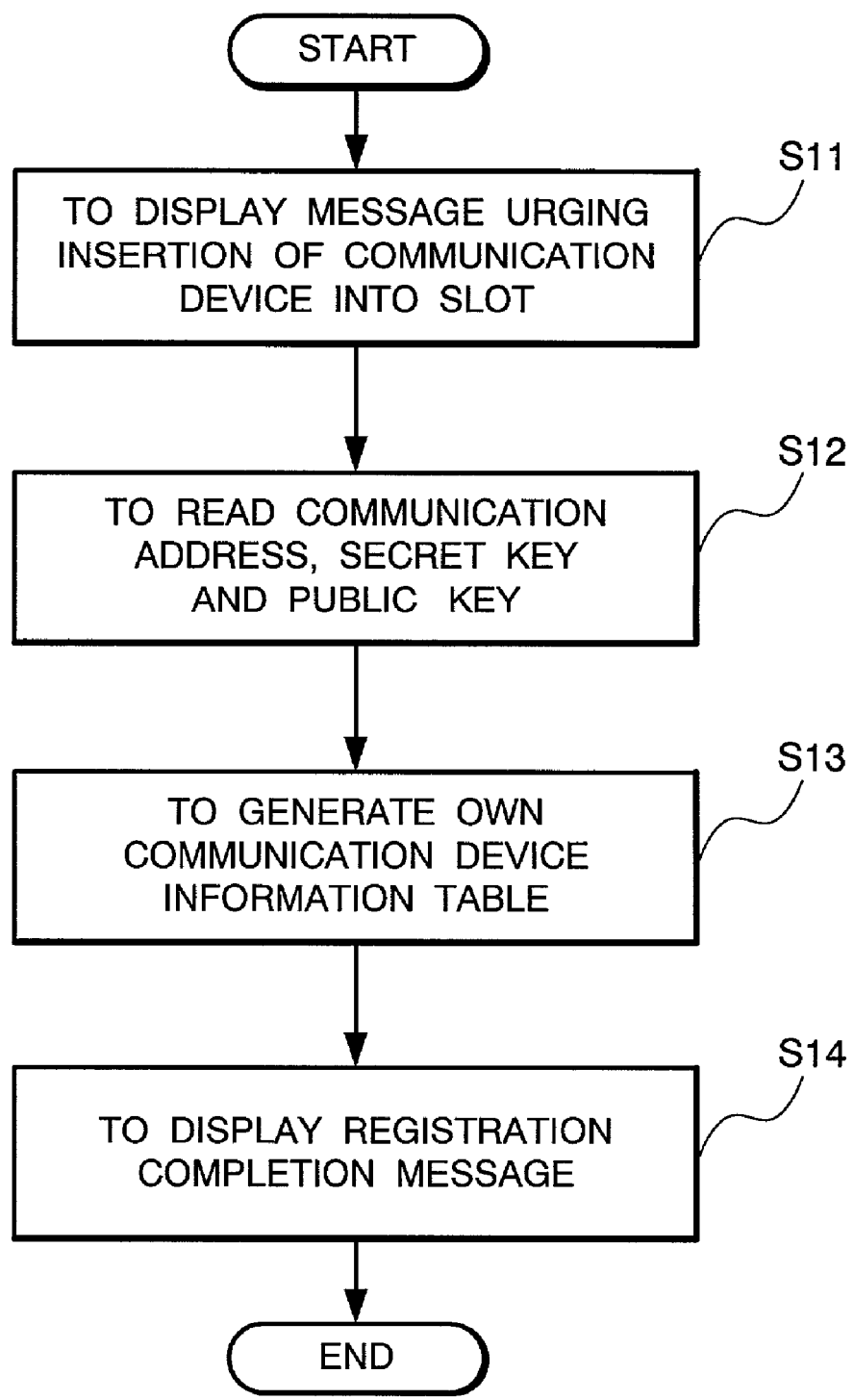
FIG. 11 is a flow chart showing a second example of processing of registering the communication device for wireless-connection at a terminal device.

When the processing of registering the own communication device for wireless-connection is started by the operation of the key pad 101 of the portable terminal device 1a, the control unit 104 starts processing shown in FIG. 11. First, display such a message as "insert the own communication device into the slot" at the display 102 (S11). When the user responsively inserts the own communication device 3a into the slot 2a, power is supplied to the communication device 3a from the power source 108 contained in the portable terminal device 1a through the socket 109 to render the communication device 3a operable. Next, the control unit 104 reads the communication address of the own communication device 3a, and the secret key and the public key of the own communication device 3a stored in the memory 35 through the interface 107, the socket 109, and the connector 31, the interface 33 and the control unit 34 of the communication device 3a (S12). Then, generate an own communication device information table (S13) and display a registration completion message at the display 102 (S14) to finish the processing. The generated own communication device information table is stored in the memory 106.

An example of the contents of an own communication device information table generated at step S13 is shown in FIG. 12(a). An own communication device information table 140 is composed of items of a communication device number, a communication address and a key. In the item of the communication address, a communication address of the own communication device 3a is set and at the communication device number, a numeric value indicated in a low-order address part of the communication address of the own communication device 3a, that is, the number 1 assigned to the communication device 3a is set. In the item of the key, the secret key and the public key of the own communication device 3a are set.

The function of assisting such registration work related to the own communication device as shown in FIG. 11 is also provided by the MPU 111 of each of the PDA 1b and the PC 1c, in which a user repeats the same work as that for the portable terminal device 1a for the PDA 1b and PC 1c by using the communication devices 3b and 3c. As a result, at the RAM 114 of each of the PDA 1b and the PC 1c, the same own communication device information table as that shown in FIG. 7(a) is stored. Since the communication device 3a, and the communication devices 3b and 3c are different in a communication address, a secret key and a public key, the contents also differ.

Next, description will be made of the work for registering, at each of terminal devices 1a to 1c, the communication addresses and public keys of the communication devices 3a to 3c allotted to other terminal devices.

Figure 13:
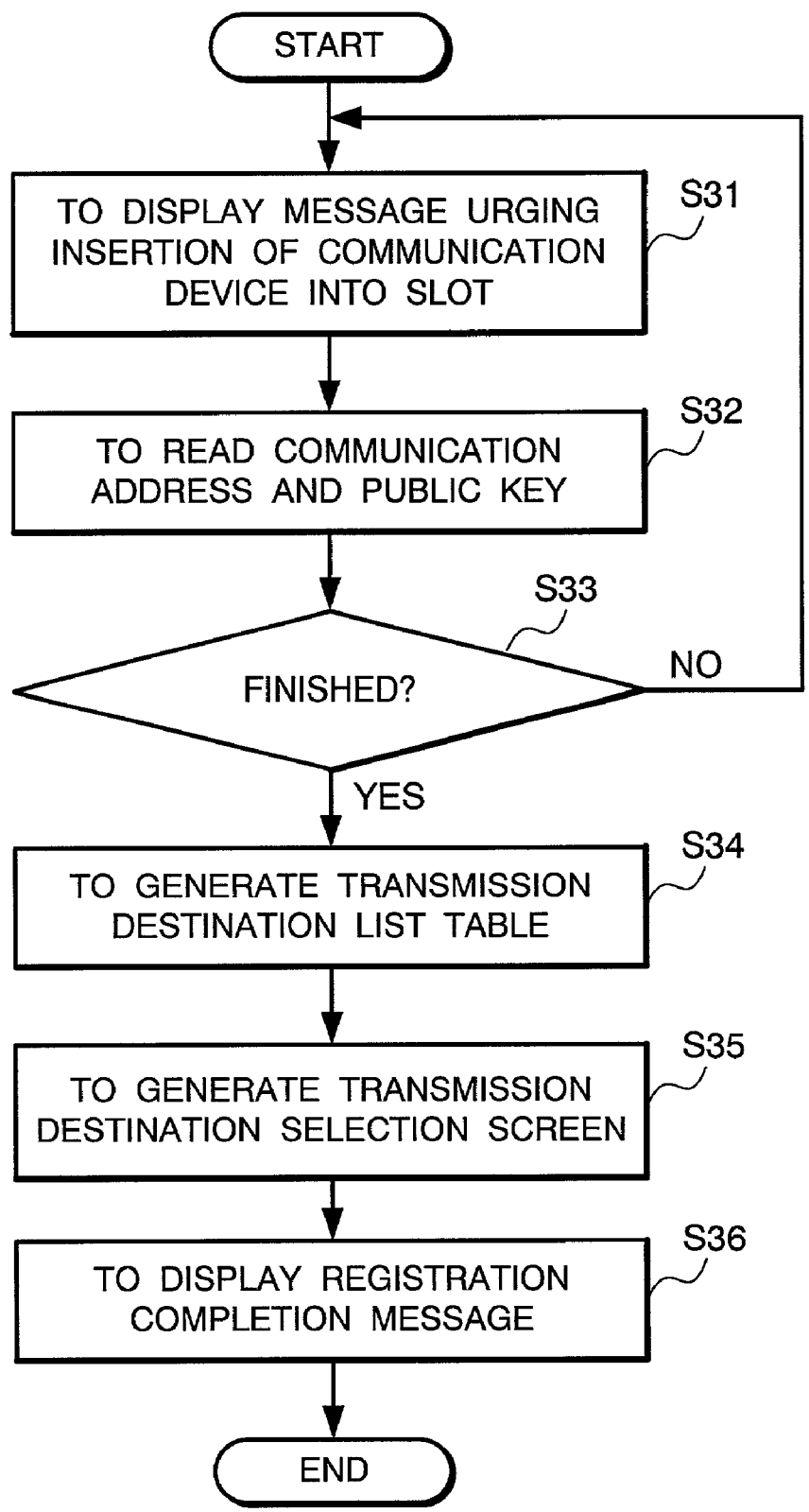
FIG. 13 is a flow chart showing a third example of processing of registering the communication device for wireless-connection at a terminal device.

When the registration processing of the communication device for wireless-connection is started by the operation of the key pad 101 of the portable terminal device 1a, the control unit 104 starts processing shown in FIG. 13. First, display such a message as "insert other communication device into the slot" at the display 102 (S31). When the user responsively inserts, for example, the communication device 3b into the slot 2a, the power source 108 contained in the portable terminal device 1a renders the communication device 3b operable. Next, the control unit 104 reads the communication address of the communication device 3b and the public key of the communication device 3a stored in the memory 35 through the interface 107, the socket 109, and the connector 31, the interface 33 and the control unit 34 of the communication device 3a and temporarily holds the same in the memory 106 (S32). Then, the control unit 104 displays a message indicating whether there still remains other communication device or not at the display 102 to inquire of a user and when other communication device exists (No at S33), returns to Step S31 to repeat the foregoing processing. In the present case, since the communication device 3c remains, when the user inserts the communication device 3c into the slot 2a in place of the communication device 3b, the communication address and the public key of the communication device 3c are read and temporarily held in the memory 106.

When registration of the communication addresses and the public keys of other communication devices 3b and 3c at the portable terminal device 1a is completed and a user inputs the completion of other communication devices through the key pad 101 (Yes at Step S33), the control unit 104 generates a transmission destination list table (S34), generates a transmission destination selection screen (S35) and displays a registration completion message at the display 102 (S36) to finish the processing. The generated transmission destination list table and transmission destination selection screen are preserved in the memory 106.

An example of the contents of a transmission destination list table generated at step S34 is shown in FIG. 12(b). A transmission destination list table 141 is composed of respective entries of other communication devices 3b and 3c, each entry including items of a communication device number, a communication address and a key. In the item of the communication address, communication addresses of other communication devices 3b and 3c are set. At the communication device number, numeric values indicated in low-order address parts of the communication addresses of other communication devices 3b and 3c, that is, the numbers 2 and 3 assigned to other communication devices 3b and 3c are set. In the item of the key, the public keys of other communication devices 3b and 3c are set.

As shown in FIG. 12(c), the transmission destination selection screen generated at step S 35 is the same as that illustrated in FIG. 7(c).

Figure 12:
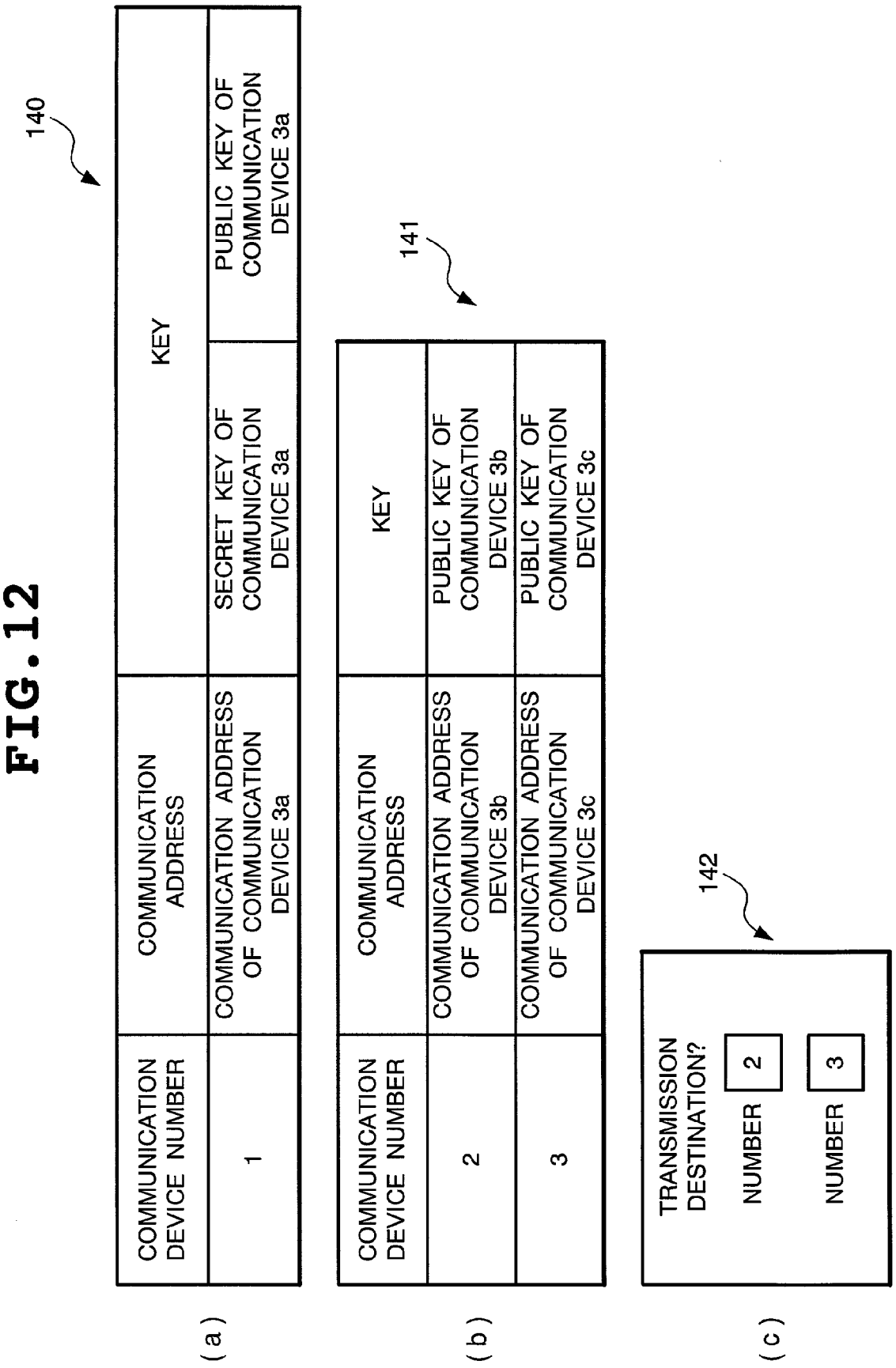
FIG. 12 is a diagram showing another example of an own communication device information table, a transmission destination list table and a transmission destination selection screen generated by the registration processing of the communication device for wireless-connection.

The function of assisting such registration work of other communication devices as shown in FIG. 13 is also provided by the MPU 111 of each of the PDA 1b and the PC 1c, in which a user repeats the same work as that for the portable terminal device 1a for the PDA 1b and the PC 1c. As a result, at the RAM 114 of each of the PDA 1b and the PC 1c, the same transmission destination list table and transmission destination selection screen table as those shown in FIG. 12 are preserved. However, the stored contents differ because registered in the PDA 1b are the communication addresses and the public keys of the communication device 3a and the communication device 3c and registered in the PC 1c are the communication addresses and the public keys of the communication device 3a and the communication device 3b.

Upon completion of the foregoing registration work, wireless transmission and reception of data is enabled among the portable terminal device 1a, the PDA 1b and the PC 1c similarly to the specific example 1.

Although in the present specific example, the portable terminal device 1a, the PDA 1b and the PC 1c are wireless-connected to each other, structure is not limited thereto. For example, in a case where a connection between the portable terminal device 1a and the PDA 1b is unnecessary, only the communication device 3c of the PC 1c may be registered as other communication device at the portable terminal device 1a and only the communication device 3a of the portable terminal device 1a may be registered as other communication device at the PDA 1b.

SPECIFIC EXAMPLE 4

The present embodiment is the same as the specific example 1 with the only difference from the specific example 3 being that with any one of a plurality of terminal devices to be wireless-connected being assumed to be an information distribution server, a transmission destination list table is distributed from the server to all the other terminal devices. In a case of the present specific example, after inserting the three communication devices 3a to 3c shown in FIG. 10 into the slots of their assigned terminal devices 1a, 1b and 1c, respectively, and registering such communication addresses, secret keys and public keys of the own communication devices 3a to 3c as illustrated in FIG. 12(a) in the own communication device information tables of the respective terminal devices 1a to 1c, with the terminal device 1a, for example, as an information distribution server, processing is conducted of registering the communication addresses and the public keys of the communication devices 3a to 3c assigned to the other terminal devices at the respective terminal devices 1a to 1c.

Figure 14:
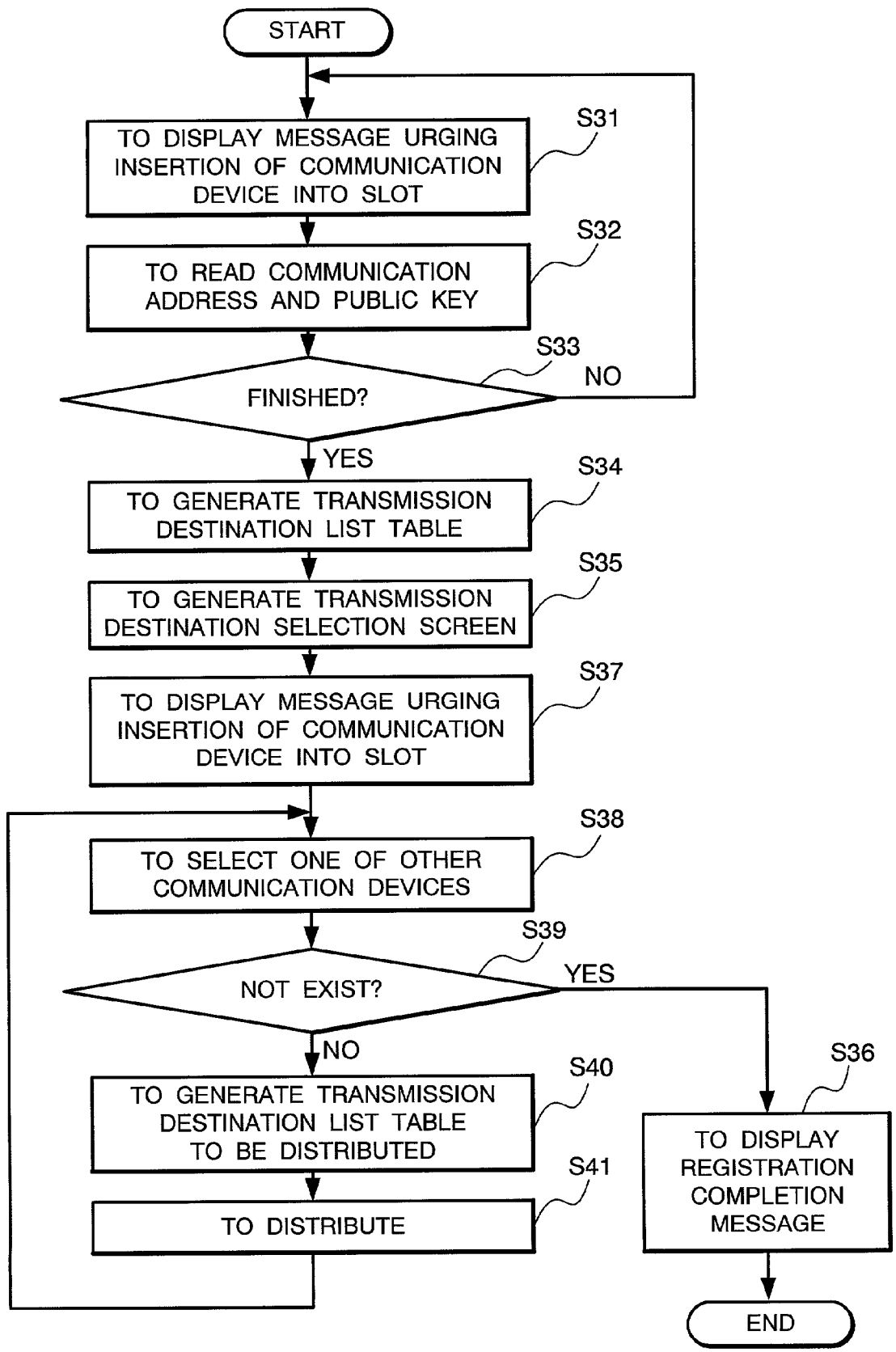
FIG. 14 is a flow chart showing a fourth example of processing of registering communication device for wireless-connection at a terminal device.

When the registration processing of other communication device for wireless-connection is started by the operation of the key pad 101 of the portable terminal device 1a, the control unit 104 starts processing shown in FIG. 14. Steps S31 to S35 are the same as those of the specific example 3, in which such transmission destination list table 141 and transmission destination selection screen 142 as illustrated in FIGS. 12(b) and 12(c) are generated. Subsequently, the control unit 104 displays a message urging insertion, into each terminal device, of a communication device allotted thereto at the display 102 (S37). The user conducts work of inserting the communication device into the slot according to the message.

Next, the control unit 104 selects one other communication device, for example, the communication device 3b from the transmission destination list table 141 (S38) to generate a transmission destination list table to be distributed which is obtained by replacing the communication device number, the communication address and the public key related to the selected communication device 3b in the transmission destination list table 141 by the communication device number, the communication address and the public key related to the own communication device 3a in the own communication device information table 140 (S40). Then, transmit the obtained transmission destination list table to the PDA 1b having the selected communication device 3b inserted into the slot 2b by using the communication device 3a inserted into the slot 2a of the own device 1a (S41). In this transmission, the communication address of the communication device 3b is set as the transmission destination address. In addition, the transmission destination list table is encrypted by the public key of the communication device 3b.

Upon receiving the distributed data, the communication device 3b inserted into the slot 2b of the PDA 1b transmits the data to the PDA 1b, so that the MPU 111 of the PDA 1b decodes the data by the secret key of the own communication device 3b and stores the obtained transmission destination list table in the RAM 114. In addition, the MPU 111 generates a transmission destination selection screen based on the communication device number registered in the transmission destination list table and stores the same in the RAM 114.

Upon completion of the distribution to the PDA 1b, the control unit 104 of the portable terminal device 1a next selects the communication device 3c (S38) to generate a transmission destination list table to be distributed which is obtained by replacing the communication device number, the communication address and the public key related to the selected communication device 3c in the transmission destination list table 141 by the communication device number, the communication address and the public key related to the own communication device 3a in the own communication device information table 140 (S40) and transmits the obtained transmission destination list table to the PC 1c (S41). Upon receiving the distributed data, the communication device 3c inserted into the slot 2c of the PC 1c transmits the data to the PC 1c, so that the MPU 111 of the PC 1c decodes the data by the secret key of the own communication device 3c and stores the obtained transmission destination list table in the RAM 114. In addition, the MPU 111 generates a transmission destination selection screen based on the communication device number registered in the transmission destination list table and stores the same in the RAM 114.

The control unit 104 of the portable terminal device 1a confirms that no communication device yet to be processed remains in the transmission destination list table 141 (Yes at S39) and displays the registration completion message (S36) to end the processing.

SPECIFIC EXAMPLE 5

Figure 15:
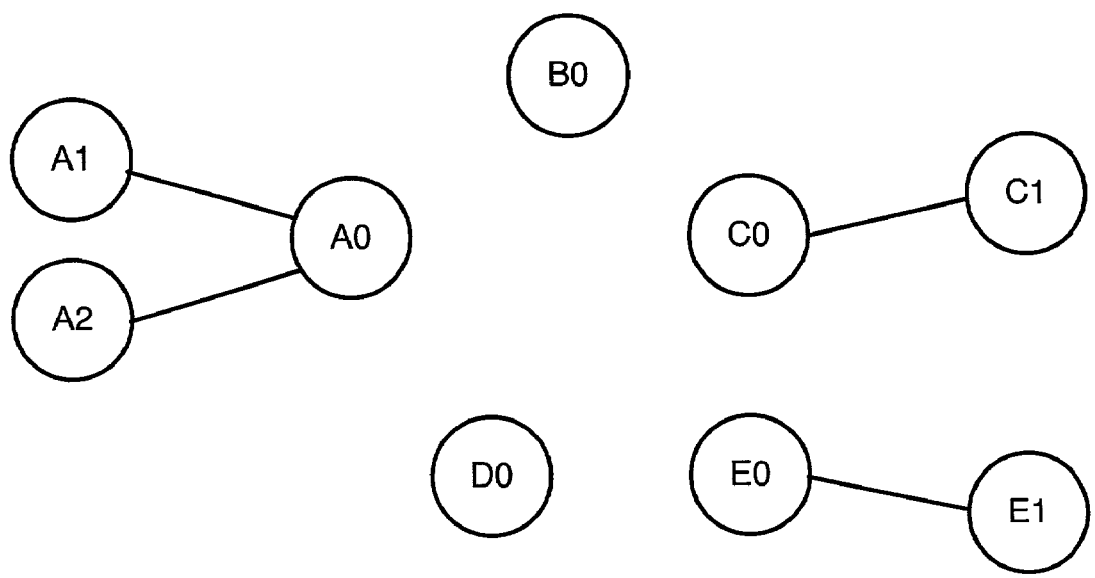
FIG. 15 is a diagram showing one example of a group of communication devices to be wireless-connected.

The present specific example is a combination of the specific examples 3 and 4. More specifically, any of a plurality of terminal devices wireless-connected according to the structure of the specific example 3 is set at an information distribution server and registration of a new communication partner is realized by the structure of the specific example 4. Operation of the present specific example will be described with respect to a case, for example, as shown in FIG. 15, where under a condition that three groups exist including communication devices A1, A2 and A0 wireless-connected by radio, communication devices C0 and C1 similarly wireless-connected by radio and communication devices E0 and E1 similarly wireless-connected by radio, new communication devices B0 and D0 are introduced to wireless-connect the communication devices A0, B0, C0, D0 and E0 with each other. For the convenience of explanation, assume that the communication device A0 is the communication device 3a inserted into the portable terminal device 1a.

First, similarly to the specific example 4, register communication addresses and secret keys and public keys of the new communication devices B0 and D0 at terminal devices to which the new devices are allotted.

Figure 16:
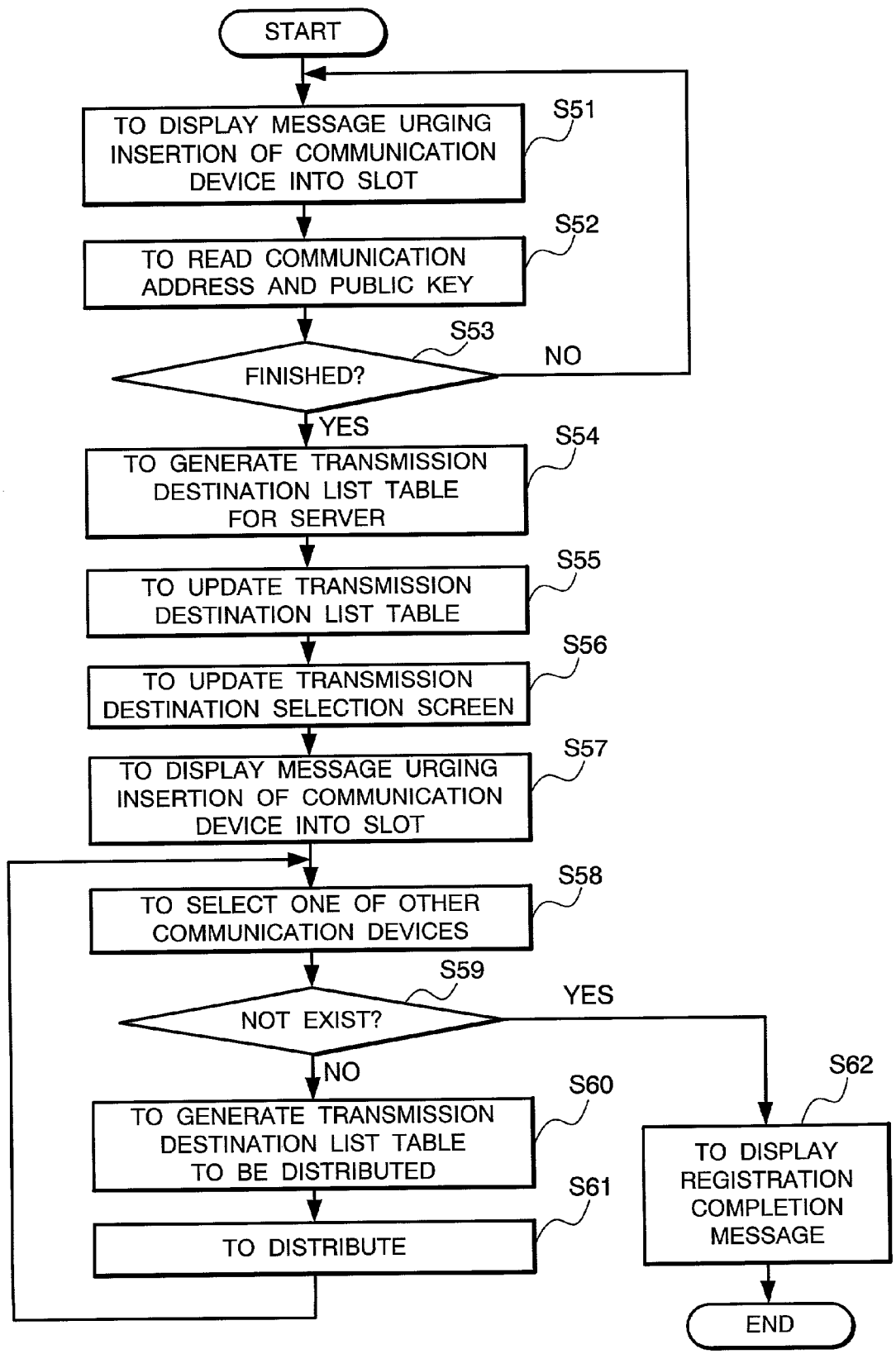
FIG. 16 is a flow chart showing a fifth example of processing of registering the communication device for wireless-connection at a terminal device.

Next, when additional processing of other communication device for wireless-connection is started by the operation of the key pad 101 of the portable terminal device 1a, the control unit 104 starts processing shown in FIG. 16. First, display such a message as "insert other additional communication device into the slot" at the display 102 (S51). When the user responsively inserts the communication device B0 into the slot 2a, the power source 108 contained in the portable terminal device 1a renders the communication device B0 operable. Next, the control unit 104 reads the communication address of the communication device B0 and the public key of the communication device B0 stored in the memory 35 through the interface 107, the socket 109, and the connector 31, the interface 33 and the control unit 34 of the communication device B0 and temporarily holds the same in the memory 106 (S52). Then, the control unit 104 displays a message indicating whether there still remains other communication device or not at the display 102 to inquire of a user and when other communication device exists, returns to Step S51 to repeat the foregoing processing. In the present case, since the communication devices D0, C0 and E0 remain, when the user inserts these communication devices into the slot 2a in place of the communication device B0, the communication address and the public key of each communication device are read and temporarily held in the memory 106.

After the communication addresses and the public keys of the communication devices B0, D0, C0 and E0 are registered at the portable terminal device 1a and the user inputs the completion of the additional other communication device through the key pad 101 (Yes at S53), the control unit 104 generates a transmission destination list table for server (S54) to update the transmission destination list table and the transmission destination selection screen already generated in the memory 106 (S55 and S56). Here, the transmission destination list table for server is a table in which communication device numbers, communication addresses and public keys of the added communication devices B0, D0, C0 and E0 are set. In addition, to the transmission destination list table and the transmission destination selection screen, information about the communication devices set at the transmission destination list table for server is added.

Subsequently, the control unit 104 displays a message urging insertion, into each terminal device, of a communication device assigned thereto at the display 102 (S57). The user conducts insertion work of the communication device into the slot according to the message.

Next, the control unit 104 selects one other communication device, for example, the communication device B0 from the transmission destination list table for server (S58) to generate a transmission destination list table to be distributed which is obtained by replacing the communication device number, the communication address and the public key related to the selected communication device B0 in the transmission destination list table for server by the communication device number, the communication address and the public key related to the own communication device A0 in the own communication device information table (S60). Then, transmit the obtained transmission destination list table to the terminal device having the selected communication device B0 inserted into the slot by using the communication device A0 inserted into the slot 2a of the own device (S61). In this transmission, the communication address of the communication device B0 is set as a transmission destination address. In addition, the transmission destination list table is encrypted by the public key of the communication device B0.

Upon receiving the distributed data, the communication device B0 transmits the data to the terminal device through the slot, so that the control unit of the terminal device decodes the data by the secret key of the own communication device B0 and stores the obtained transmission destination list table in the memory. In addition, the control unit generates a transmission destination selection screen based on the communication device number registered at the transmission destination list table and stores the same in the memory.

Upon completion of the distribution to the communication device B0, the control unit 104 of the portable terminal device 1a conducts the same processing with respect to the communication devices D0, C0 and E0. The communication device D0 side conducts the same operation as that of the communication device B0, while the communication devices C0 and E0, since the transmission destination list table and the transmission destination selection screen are already generated, updates them by the sent information. Upon completion of the distribution to the communication devices B0, D0, C0 and E0, the control unit 104 displays the registration completion message (S62) to end the processing.

Completion of the foregoing registration work enables communication among the communication devices A0, B0, C0, D0 and E0. However, communication is impossible from the communication device B0 to the communication devices A1, A2, C1 and E1, from the communication device C0 to the communication devices A1, A2 and E1, from the communication device D0 to the communication devices A1, A2, C1 and E1 and from the communication device E0 to the communication devices A1, A2 and C1.

SPECIFIC EXAMPLE 6

Figure 17:
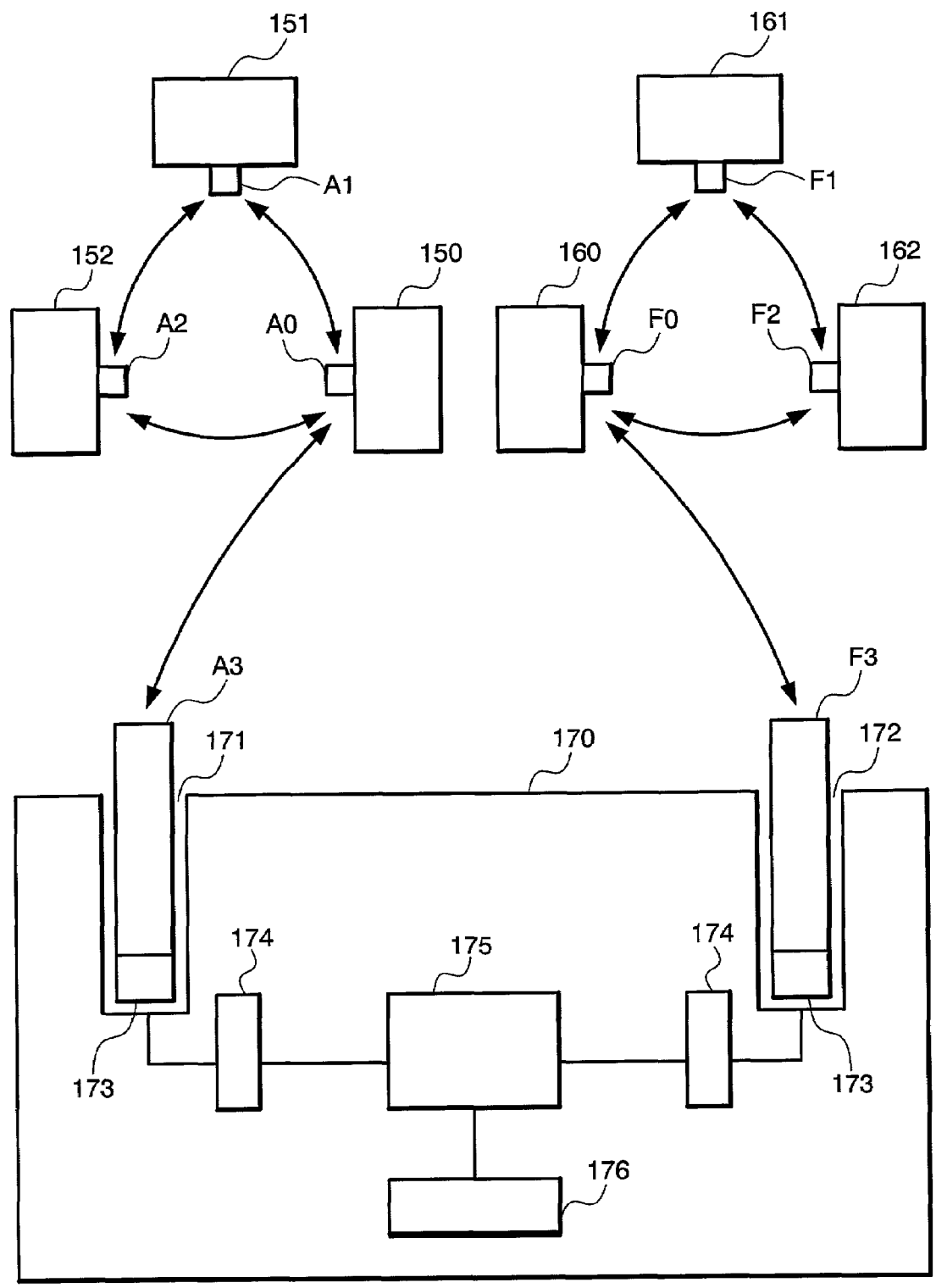
FIG. 17 is a block diagram showing an example of a structure for the communication between communication devices of different sets using a relay device.

In the present specific example, communication between communication devices of different sets is realized using a relay device. An example of a structure therefor is shown in FIG. 17. Terminal devices 150 to 152 are wireless-connected to each other by communication devices A0 to A3 inserted into their slots. Terminal devices 160 to 162 are wireless-connected to each other by communication devices F0 to F3 inserted into their slots. Here, the communication devices A0 to A3 are those of the same set using K1 as a common key. On the other hand, the communication devices F0 to F3 are those of the same set using K2 as a common key. Direct communication between the terminal devices 150 and 160 is impossible because their common keys are different. A relay device 170 is a device for relaying communication between such different sets which has two slots 171 ad 172 and includes a socket 173, an interface 174, a control unit 175 and a memory 176.

Figure 18:
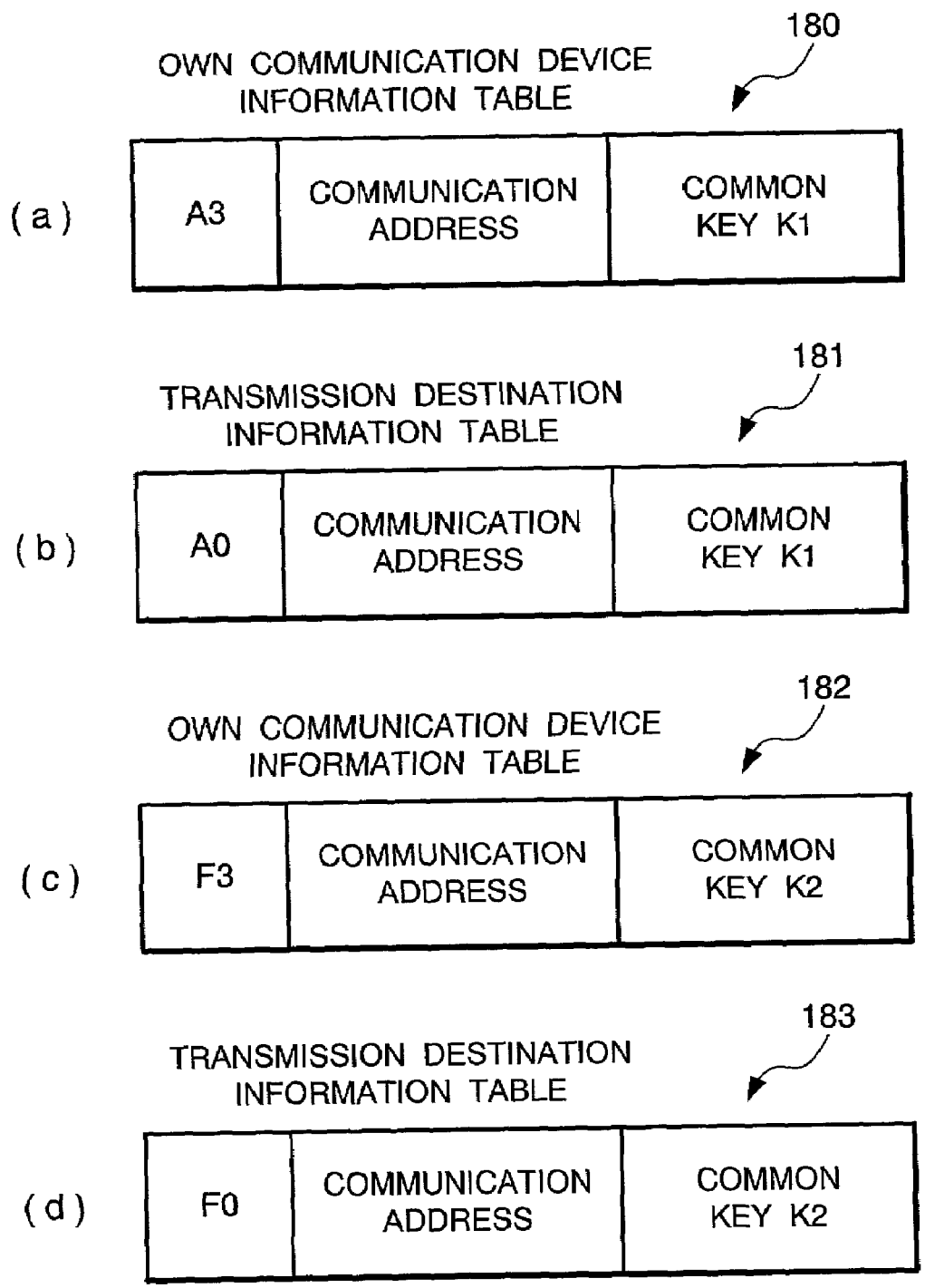
FIG. 18 is a diagram showing an example of an own communication device information table and a transmission destination information table generated for each slot of the relay device.

First, according to the method described in the specific example 3, insert the communication device A3 of the same set as that of the communication device A0 into the slot 171 to generate, on the memory 176, such an own communication device information table 180 adapted to the slot 171 and having the number, the communication address and the common key K1 of the communication device A3 as shown in FIG. 18(a) and also insert the communication device A0 into the slot 171 to generate, on the memory 176, such a transmission destination information table 181 adapted to the slot 171 and having the number, the communication address and the common key K1 of the communication device A0 as shown in FIG. 18(b). Moreover, register the communication device number, the communication address and the common key K1 of the communication device A3 in a transmission destination list table of the terminal device 150. The same work is conducted on the side of the slot 172. More specifically, insert the communication device F3 of the same set as that of the communication device F0 into the slot 172 to generate, on the memory 176, such an own communication device information table 182 adapted to the slot 172 and having the number, the communication address and the common key K2 of the communication device F3 as shown in FIG. 18(c) and also insert the communication device F0 into the slot 172 to generate, on the memory 176, such a transmission destination information table 183 adapted to the slot 172 and having the number, the communication address and the common key K2 of the communication device F0 as shown in FIG. 18(d). Moreover, register the communication device number, the communication address and the common key K2 of the communication device F3 in a transmission destination list table of the terminal device 160. As a result, the communication device A0 and the communication device A3 are wireless-connected and the communication device F0 and the communication device F3 are wireless-connected.

When the data encrypted by the common key K1 is sent from the terminal device 150 having the communication device A0 to the communication device A3, the control unit 175 of the relay device 170 decodes the encrypted data by the common key K1 of the own communication device information table 180 adapted to the slot 171 and again encrypts the decoded data by the common key K2 of the own communication device information table 182 adapted to the slot 172. Then, the unit 175 transmits to the communication device F0 by the communication device F2, transmission data obtained by adding, to the encrypted data, a communication address of the own communication device information table 182 adapted to the slot 172 as a transmission source address and a communication address of the transmission destination information table 183 adapted to the slot 172 as a transmission destination address. The terminal device 160 having the communication device F0 which receives the data decodes the common key K2. Reverse relay to this operation is also conducted in the same manner.

While the foregoing procedures enables connection between communication devices of different sets by using the device 170 dedicated to relay, the terminal device itself may be designed to have a function of realizing relay between not less than two slots.

In the above-described respective specific examples, assigning an inherent number to a communication device, setting the number at a low-order address part of a communication address of the communication device and displaying the number on a transmission destination selection screen enables a user to recognize which communication device is inserted into which terminal device. In place of this method, such arrangement is possible that after at each terminal device, a communication address of the own communication device and a communication address of other communication device are registered, each terminal device designates the communication address of other communication device as a transmission destination address and the communication address of the own communication device as a transmission source address to transmit a message to other terminal device to inquire about the device name, and a terminal device having received the message returns a name of the own terminal device (e.g. a portable terminal device or a PDA) to display the name in place of the above number or together with the number on the transmission destination selection screen.

OTHER EMBODIMENTS OF THE PRESENT INVENTION

The foregoing description has been made of a structure for wireless-connecting the portable terminal device 1a, the PDA 1b and the PC 1c of FIG. 1. In the following, description will be made of an example of an arrangement at the time when mobile communication services are used by the portable terminal device 1a, the PDA 1b and the PC 1c of FIG. 1.

FIG. 19 shows a set of communication devices for use when a mobile communication service is used, in which 4a represents a communication device for a PHS system, 5a represents that for a PDC system and 6a represents that for a CDMA system (hereinafter referred to as a radio module) all of which are inserted into a slot of a terminal device at the time of using a mobile communication system. On the other hand, 4b, 5b and 6b are key modules for authentication which are for preventing false use of a normal radio module in other terminal devices than a normal terminal device and correspond one to one to the radio modules 4a, 5a and 6a, respectively. All the radio modules and key modules have the same configuration unified by the same standard as that of the above-described communication device for wireless-connection. Moreover, a part of the radio modules 4a, 5a and 6a projecting from a slot of a terminal device when inserted into the slot (a hatched part in FIG. 19) is colored according a kind of mobile communication service available to enable recognition for which mobile communication service a radio module serves to be instantly made by looking at the color. The radio modules 4a, 5a and 6a do not always need to project from the slot as long as they are exposed.

Figure 20:
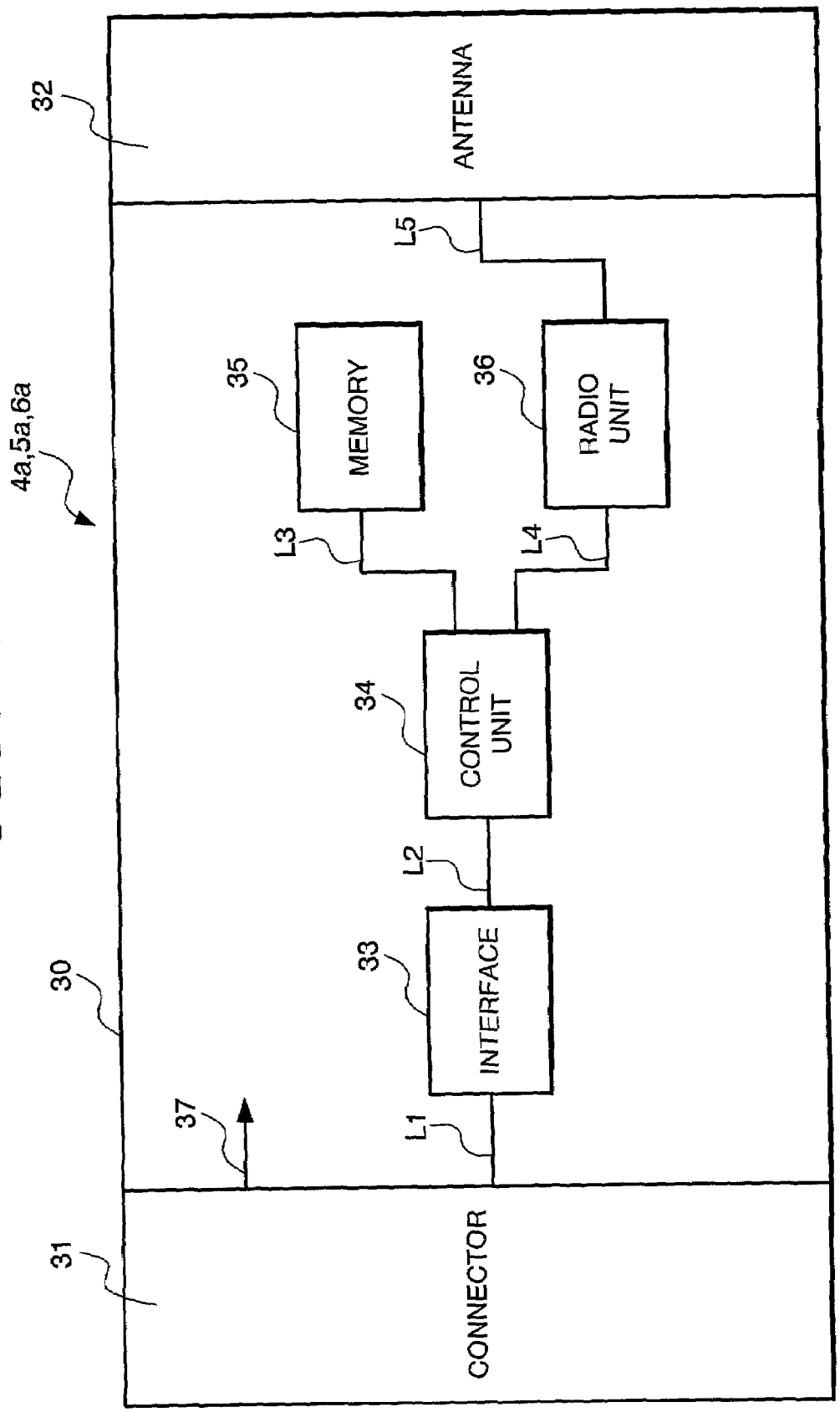
FIG. 20 is a block diagram showing an example of a structure of a communication device for use in a mobile communication service.

Structures of the radio modules 4a, 5a and 6a are the same as those of the communication devices 3a to 3c for wireless-connection shown in FIG. 2 and as shown in FIG. 20, have a connector 31 and an antenna 32 at the opposite ends of a casing 30 and include, in the casing 30, an interface 33, a control unit 34, a memory 35, a radio unit 36 and signal lines L1 to L5 for connecting elements, and a power supply line 37. The radio unit 36 in the radio module 4a is designed to be adaptable to the PHS system, in the radio module 5a, to be adaptable to the PDC system and in the radio module 6a, to be adaptable to the CDMA system. In addition, each memory 35 is structured by a non-volatile memory such as an EEPROM and stores predetermined authentication data, and a charge code when used in the PHS or the PDC.

Figure 21:
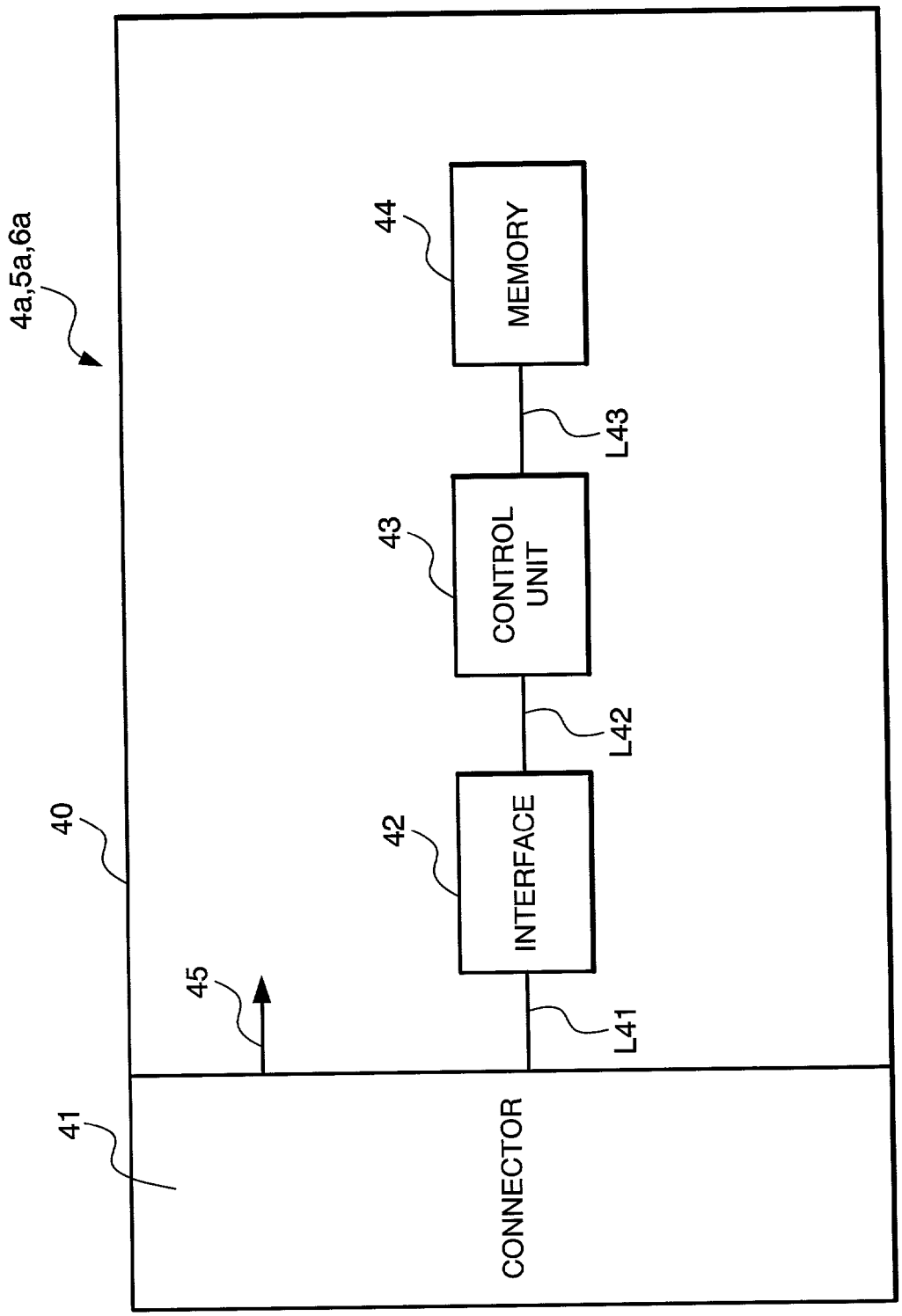
FIG. 21 is a block diagram showing an example of a structure of a key module.

The key modules 4b, 5b and 6b each have a connector 41 at one end of a casing 40 and include in the casing 40 an interface 42 connected to the connector 41 through a signal line L41, a control unit 43 connected to the interface through a signal line L42 and a memory 44 connected to the control unit through a signal line L43 as shown in FIG. 21. Also included is a power supply line 45 for transmitting power supplied from the terminal device side through the connector 41 to each part. The memory 44 is a non-volatile memory such as an EEPROM for storing predetermined information for use in authentication. The connector 41 and the interface 42 constitute an adapter to be mechanically or electrically connected to an adapter on the terminal device side. The control unit 43 is constituted by an MPU and a ROM or the like for storing a control program to execute predetermined authentication processing.

In a case where the portable terminal device 1a of FIG. 1 is used as a PHS telephone, the key module 4b paired with the PHS radio module 4a is inserted into the slot 2a to register data for authentication stored in the memory 44 at the portable terminal device 1a. Then, at the actual use, the PHS radio module 4a is inserted into the slot 2a to use the PHS system. At this time, authentication is conducted between the radio module 4a and the portable terminal device 1a. The radio module 4a is not available unless authentication succeeds. The portable terminal device 1a can be used as a PDC telephone and a CDMA telephone. Also in such a case, data for authentication stored in the key modules 5b and 6b is registered at the portable terminal device 1a in advance to conduct authentication processing between the radio modules 5a and 6a and the portable terminal device 1a at the time when the radio modules 5a and 6a are inserted into the slot 2a. Conducting the same processing as that of the portable terminal device 1a enables the PHS system, the PDA system and the CDMA system to be used by the PDA 1b and the PC 1c using the radio modules 4a, 5a and 6a and the key modules 4b, 5b and 6b.

The key modules 4b, 5b, and 6b are not ordinarily used once authentication data is registered at a terminal device using the modules. Accordingly, even if the radio modules 4a, 5a and 6a for the PHS, PDC and CDMA systems are stolen, a possibility of false use is eliminated by safely keeping the key modules 4b, 5b and 6b, so that safe use of various radio infrastructures is enabled only by replacing the radio modules.

Specific example of authentication will be next described in the following with respect to the portable terminal device 1a as an example.

Figure 22:
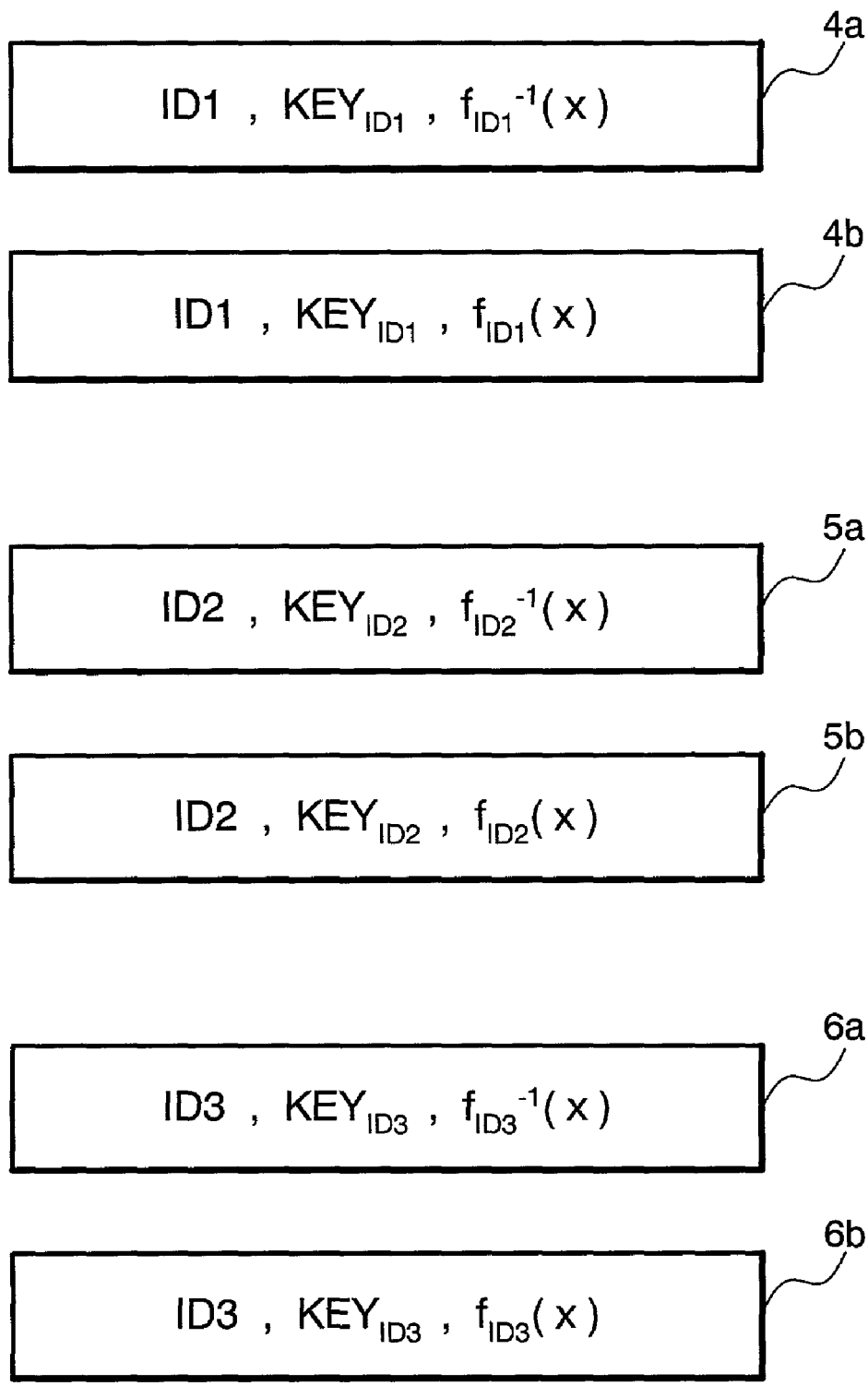
FIG. 22 is a diagram showing an example of authentication data stored in a radio module and a key module.

When the radio modules 4a, 5a and 6a are purchased at a store, dedicated key modules 4b, 5b and 6b are attached thereto. In each of the modules, such data as shown in FIG. 22 is stored in the internal memories 35 and 44 as data for use in authentication. Authentication data is composed of a module ID, an authentication code $KEY_{ID}$, a cryptographic function $f_{ID}(x)$ and its inverse cryptographic function $f_{ID}^{-1}(x)$, and in both of the radio module and its key module, the same unique module ID and authentication code $KEY_{ID}$ are stored, and the inverse cryptographic function $f_{ID}^{-1}(x)$ is stored in the radio module and its cryptographic function $f_{ID}(x)$ is stored in the key module. The authentication code $KEY_{ID}$, the cryptographic function $f_{ID}(x)$ and the inverse cryptographic function $f_{ID}^{-1}(x)$ are unique to each combination of a radio module and a key module.

First, register the authentication data stored in the key module at the portable terminal device 1a. When the key module registration processing is started by the operation of the key pad 101 of the portable terminal device 1a, the control unit 104 starts processing shown in FIG. 23. First, display a message for urging insertion of a key module into the slot 2a on the display 102 (S101). When a user inserts, for example, the key module 4b for the PHS system into the slot 2a, power is supplied from the power source 108 contained in the portable terminal device 1a to the key module 4b through the slot 2a to render each part operable. The control unit 104 reads the module ID1, the authentication code $KEY_{ID1}$ and the cryptographic function $f_{ID1}(x)$ stored in the memory 44 through the interface 107, the socket 109, the connector 41, the interface 42 and the control unit 43 (S102) and preserves the same in an authentication code (S103).

Next, the control unit 104 displays a message indicating whether there still remains other key module to be registered or not on the display 102 to inquire of a user and when other key module exists (No at S104), returns to Step S101 to repeat the foregoing processing. When the user has other module for the PDC system or the CDMA system than that for the PHS system, register authentication data at the portable terminal device 1a by inserting its key module into the slot 2a. If there is no other key module to be registered (Yes at S104), the control unit 104 completes the processing.

Figure 24:
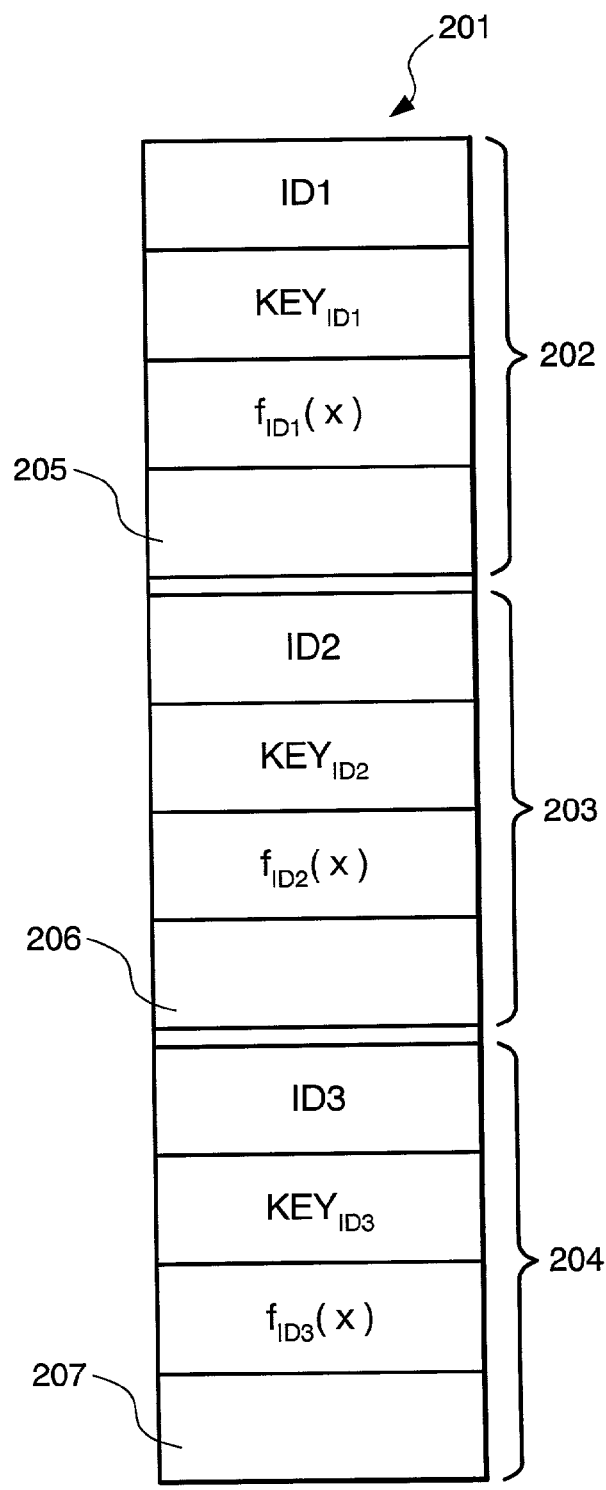
FIG. 24 is a diagram showing an example of contents of an authentication table provided on a memory of a terminal device.

FIG. 24 shows an example of the contents of an authentication table 201 provided on the memory 106 of the portable terminal device 1a. In this example, three kinds of data is set, authentication data 202 for PHS, authentication data 203 for PDC and authentication data 204 for CDMA. Entries 205 to 207 are parts in which random numbers are stored at the time of actual authentication and NULL is indicated at the time of key module registration.

Next, description will be made of authentication processing conducted when a mobile communication service is used by the portable terminal device 1a using a radio module.

Figure 25:
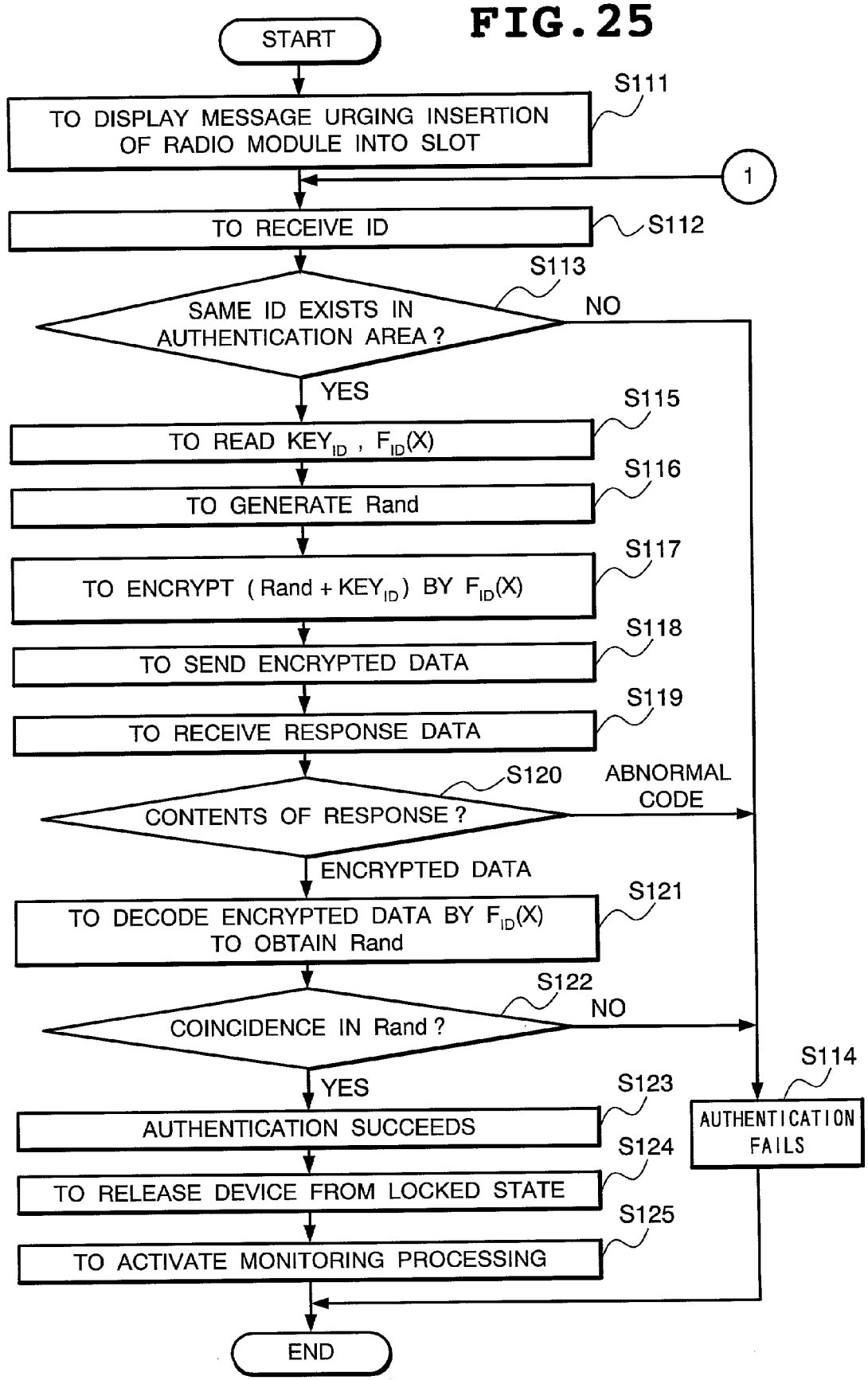
FIG. 25 is a flow chart showing one example of authentication processing conducted on the side of the terminal device.

When radio module registration processing is started by the operation of the key pad 101 of the portable terminal device 1a, the control unit 104 starts processing shown in FIG. 25. First, display a message urging insertion of a radio module into the slot 2a on the display 102 (S111). When the user inserts, for example, the radio module 4a for the PHS system into the slot 2a, power is supplied from the power source 108 contained in the portable terminal device 1a to the radio module 4a through the slot 2a to render each part operable. The control unit 104 waits for a module ID to be sent from the radio module 4a.

Figure 26:
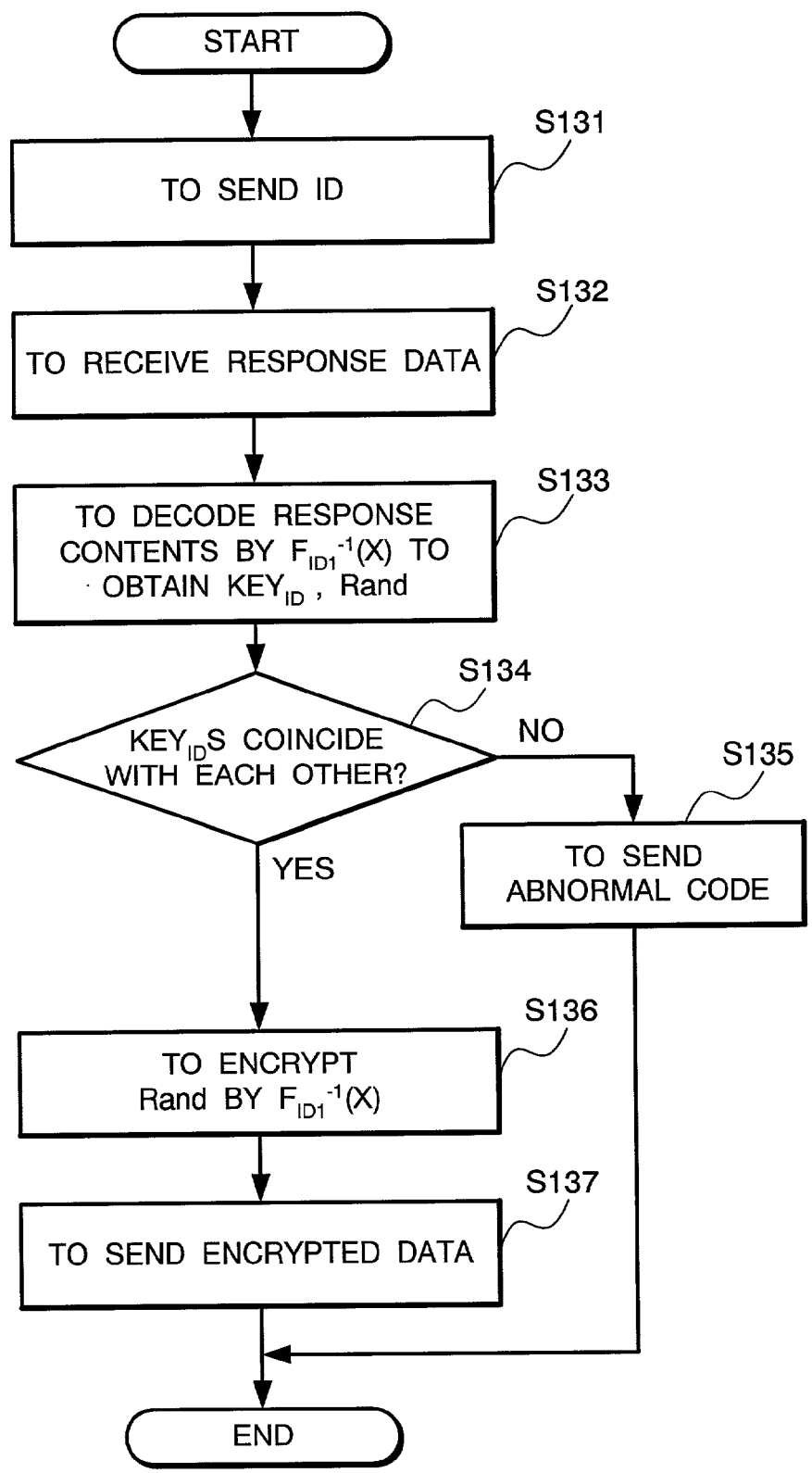
FIG. 26 is a flow chart showing one example of authentication processing conducted on the side of the radio module.

When power is applied, the control unit 34 of the radio module 4a starts authentication processing shown in FIG. 26. First, read a module ID1 stored in the memory 35 to send the same to the portable terminal device 1a through the interface 33 and the connector 31 (S131). Then, wait for response data to be sent from the portable terminal device 1a.

Upon receiving the module ID1 through the socket 109 and the interface 107 (S112), the control unit 104 of the portable terminal device 1a searches the authentication table 201 shown in FIG. 24 by using the module ID1 to determine whether the same module ID1 is registered or not (S113). When the same module ID1 is not registered (No at S113), authentication fails (S114). When the authentication fails, the control unit 104 determines that the radio module 4a in question is a false module to refrain from control using the radio module 4a in question. On the other hand, when the same module ID1 is registered (Yes at S113), read an authentication code $KEY_{ID1}$ and a cryptographic function $f_{ID1}(x)$ paired with the module ID1 in question from the authentication table 201 (S115), generate a random number Rand according to a random number generation program or the like (S116), encrypt data obtained by the $KEY_{ID1}$ and the random number Rand connected by the cryptographic function $f_{ID1}(x)$ (S117) and send the encrypted data to the radio module 4a (S118). Then, wait for response data to be sent from the radio module 4a. The generated random number Rand is stored in the authentication table for the subsequent processing.

Upon receiving the encrypted data from the portable terminal device 1a (S132), the control unit 34 of the radio module 4a decodes the encrypted data by the inverse cryptographic function $f_{ID1}^{-1}(x)$ to obtain an authentication code $KEY_{ID1}$ and a random number Rand (S133). Then, determine whether the authentication code $KEY_{ID1}$ obtained by decoding coincides with the authentication code $KEY_{ID1}$ stored in the memory 35 or not (S134) and when they fail to coincide with each other, send an abnormal code to the portable terminal device 1a (S135) to end the processing. On the other hand, when they coincide with each other, encrypt the random number Rand obtained by decoding by using the inverse cryptographic function $f_{ID1}^{-1}(x)$ (S136) and send the encrypted number to the portable terminal device 1a (S137) to end processing.

Upon receiving the response data from the radio module 4a (S119), when the data indicates an abnormal code (S120), the control unit 104 of the portable terminal device 1a considers that authentication fails (S114). When the contents of the response do not indicate an abnormal code, decode the response contents by the cryptographic function $f_{ID1}(x)$ to obtain a random number Rand (S121). Then, determine whether the random number Rand obtained by decoding and the random number Rand generated by itself at step S116 coincide with each other (S122). When they fail to coincide with each other, consider that the authentication fails (S114). When they coincide with each other, authentication succeeds (S123). Hereinafter, the control unit 104 enables the use of the PHS system using the radio module 4a in question. In a case where the authentication succeeds, if the portable terminal device 1a is locked, the control unit 104 releases the locked state (S124) and activates predetermined monitoring processing (S125) to end the processing of FIG. 25. Steps S124 and S125 will be detailed later.

Figure 23:
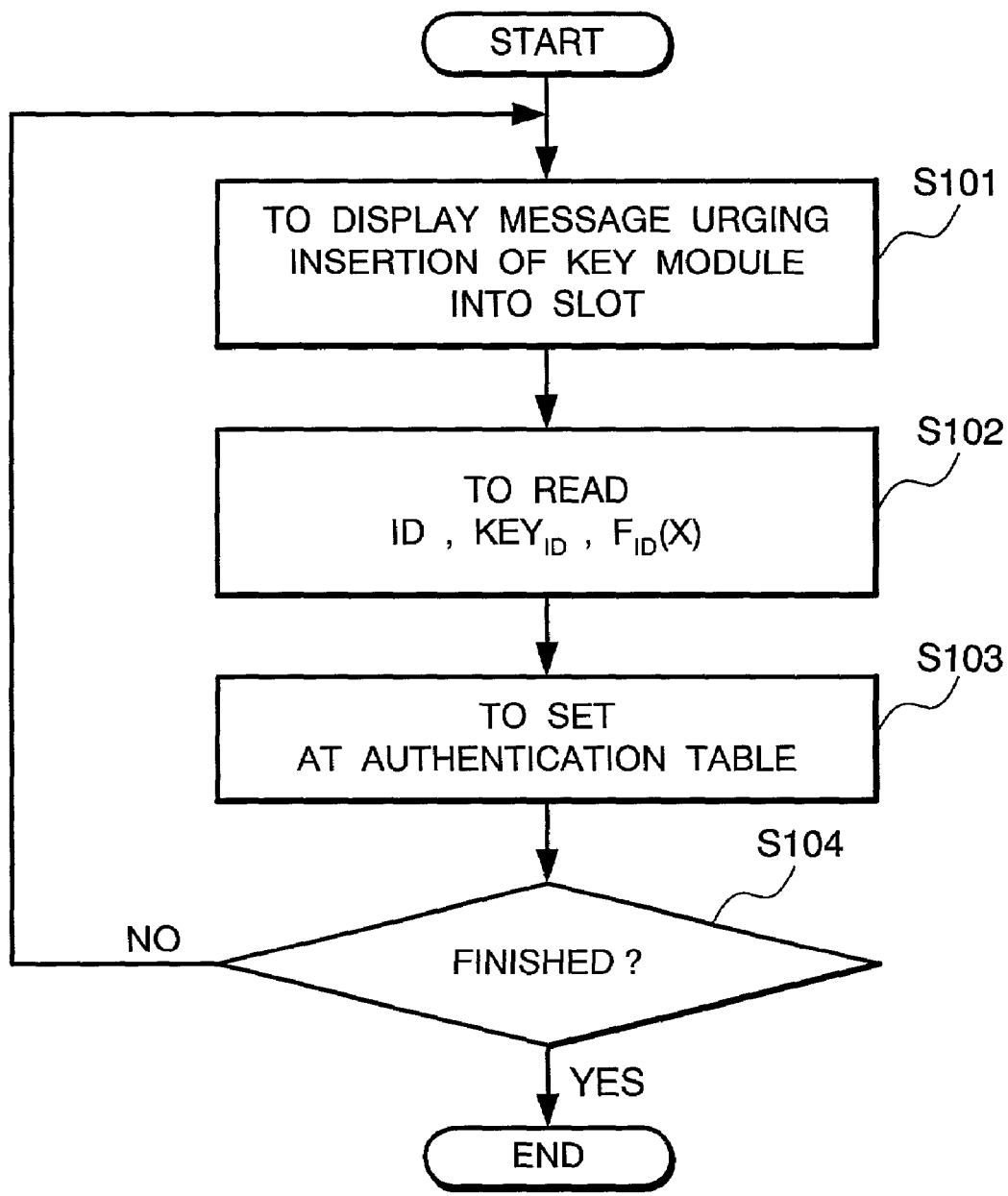
FIG. 23 is a flow chart showing one example of processing of registering authentication data at a terminal device by the key module.

Although in the foregoing, description has been made of authentication between the portable terminal device 1a and the radio module in a case where the radio module 4a of the PHS system is used, even when the radio module 5a of the PDC system and the radio module 6a of the CDMA system are used, the same authentication is conducted between the portable terminal device 1a and the radio module to enable use of the relevant radio modules 5a and 6a only when authentication succeeds. In addition, although description has been made of registration of a key module and authentication processing conducted when a radio module is used with respect to the portable terminal device 1a as an example, since such functions as shown in FIGS. 23 and 25 are provided also by the MPU 111 of each of the PDA 1b and the PC 1c, executing the same processing as that for the portable terminal device 1a enables the PDA 1b and the PC 1c to use a mobile communication service by using the radio modules 4a, 5a and 6a.

Next, Steps S124 and S125 of FIG. 25 will be described with respect to the portable terminal device 1a as an example. This is also the case with the PDA 1b and the PC 1a.

Figure 27:
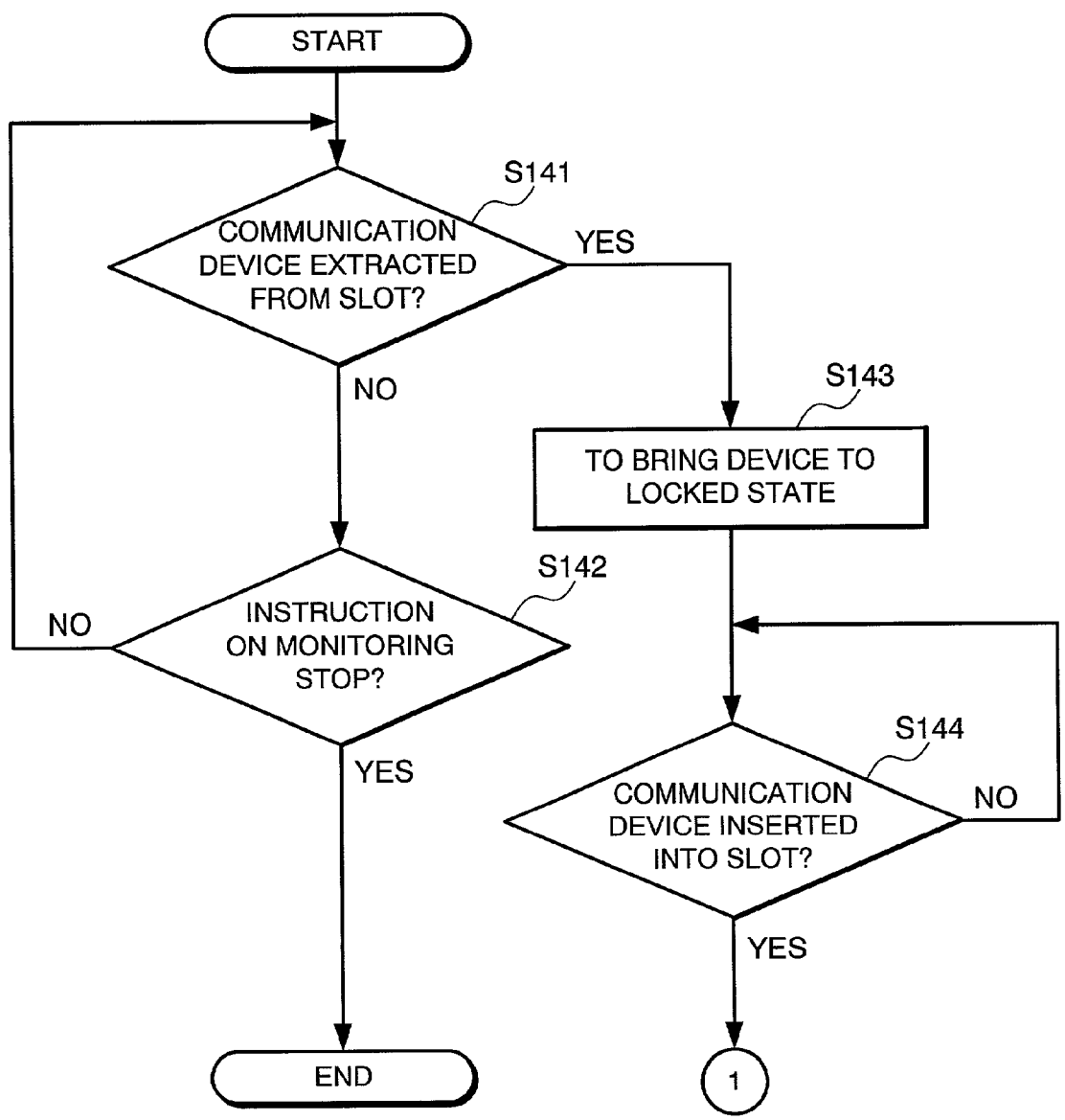
FIG. 27 is a flow chart showing one example of monitoring processing started on the side of the terminal device when authentication is obtained.

One example of monitoring processing to be started at Step S125 is shown in FIG. 27. The monitoring processing is executed irrespective of on/off of a power supply switch of the portable terminal device 1a. When the monitoring processing is started, the control unit 104 monitors whether a communication device (radio module) is extracted from the slot 2a and whether monitoring stop is instructed by predetermined key operation using the key pad 101 (Steps S141 and S142). Determination whether the communication device is extracted from the slot 2a or not is made by such arbitrary methods as that of checking whether an electrical state shows or not which is assumed at a time when, for example, a predetermined terminal of the socket 109 is connected to the connector 31 and that of communicating with a control unit of the communication device.

When the communication device is extracted from the slot 2a (Yes at S141), the control unit 104 brings the portable terminal device 1a to the locked state in which none of input to the terminal device 1a by a user is validated (S143). Accordingly, neither operation using the key pad 101 nor displaying of such information as a telephone directory stored in the memory 106 is enabled. In such a device having the tablet 121 as the PAD 1b, pen input will be invalidated and in a device having a mouse, input by the mouse will be invalidated. Thereafter, the control unit 104 monitors whether the communication device (radio module) is inserted into the slot 2a or not (S144) and when it is inserted, proceeds to step S112 in the authentication processing between the portable terminal device and the radio module shown in FIG. 25. As a result, when the extracted communication device is again inserted into the slot 2a, the authentication processing shown in FIG. 25 is executed. Then, when the authentication succeeds, the locked state of the portable terminal device 1a is released at Step S124. As a result, input operation by a user is enabled.

On the other hand, when monitoring stop is instructed during the monitoring processing (Yes at Step S142), the control unit 104 ends the monitoring processing of FIG. 27. Hereinafter, the terminal device will not enter the locked state even when the communication device is extracted from the slot 2a. This is to enable processing of registering a new key module at the portable terminal device 1a and the above-described registration processing of a communication device for wireless-connection.

FIG. 28 shows another set of communication devices for use when a mobile communication service is used, in which 7*a* represents a radio module for father, 7*b* represents a key module therefor, 8*a* represents a radio module for mother, 8*b* represents a key module therefor, 9*a* represents a radio module for oneself and 9*b* represents a key module therefor. The radio modules 7*a*, 8*a* and 9*a* are for a predetermined mobile communication service (for PHS system, for example) and inserted into a slot of a terminal device at the time of use. The key modules 7*a*, 8*a* and 9*a* are modules for use for the same purpose as that of the above-described key modules 4*b*, 5*b* and 6*b*. All the modules have the same configuration unified by the same standard as that of the above-described key modules 4*b*, 5*b* and 6*b*. Moreover, a part of the radio modules 7*a*, 8*a* and 9*a* projecting from a slot of a terminal device when inserted into the slot (a hatched part in FIG. 28) is colored according an individual user to enable instant recognition to which person the radio module belongs by looking at the color.

When an application form in which predetermined items are filled such as an address, a name and a password of each applicant is sent to a specific provider by mail or Internet, the provider sends a set of a radio module and a key module for each member. The set of modules shown in FIG. 28 is thus purchased and in each memory 35 of the individual radio modules 7*a*, 8*a* and 9*a*, every information necessary for the connection to the provider in question (referred to as provider connection information) is stored in advance. The provider connection information includes a user name that the provider assigns to each member, a password each member applies and a telephone number of the nearest access point. At the time of use, in the same manner as that described above, register the authentication data stored in the key modules 7*b*, 8*b* and 9*b*, for example, in the portable terminal device 1*a* and then insert the personal radio module 7*a*, or 8*a* or 9*a* into the slot 2*a* of the portable terminal device 1*a* to use the service after obtaining authentication. For using the Internet, provider connection information stored in the radio modules 7*a*, 8*a* and 9*a* is used.

Figure 29:
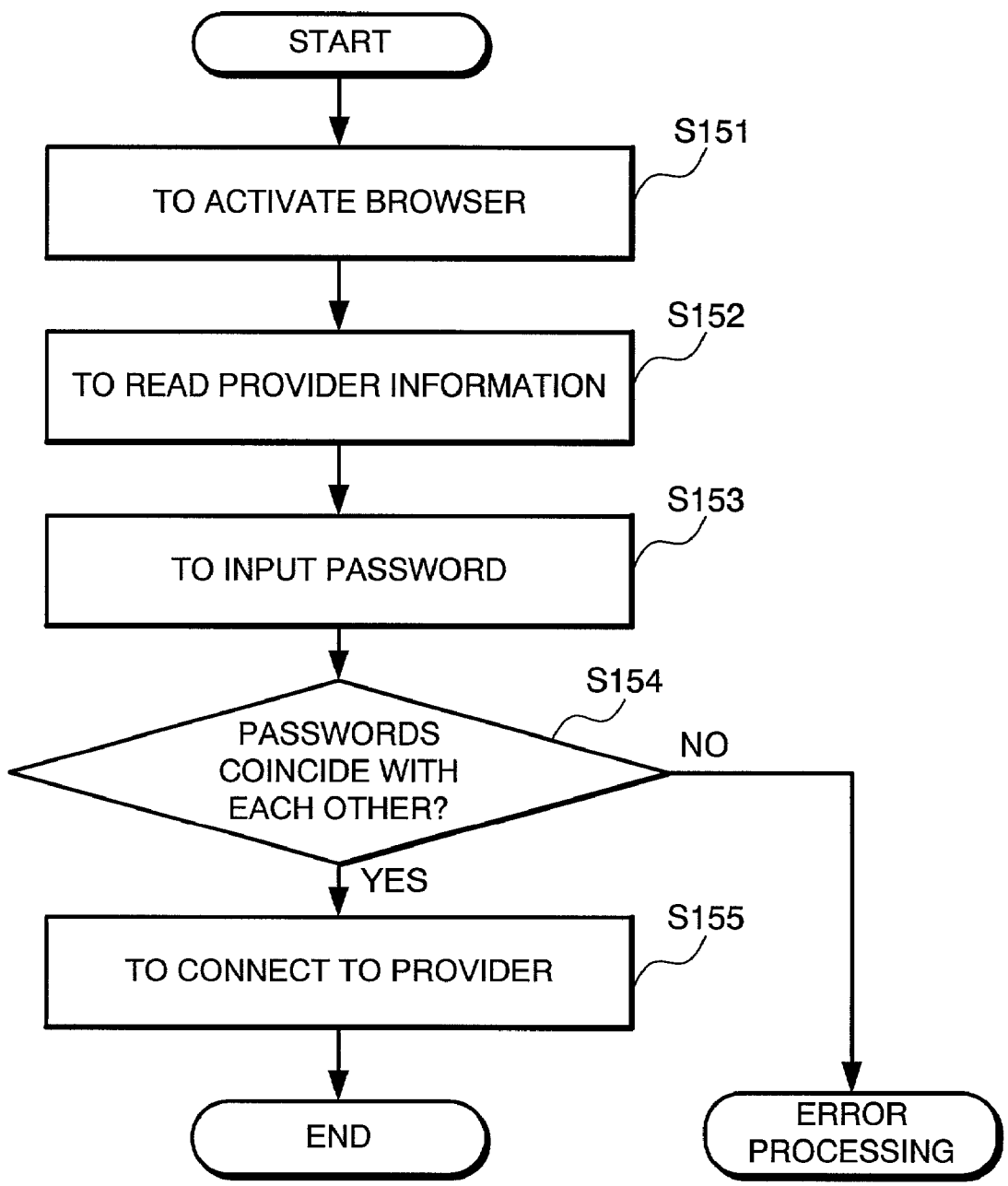
FIG. 29 is a flow chart showing one example of processing conducted for connecting the terminal device to the Internet using a radio module.

FIG. 29 shows one example of processing executed at the time of connecting to the Internet by inserting, for example, the radio module 7*a* into the slot 2*a* of the portable terminal device 1*a*. When a user activates a browsing function that the control unit 104 has by the operation of the key pad 101 of the portable terminal device 1*a*, the browser is started (S151). Next, the control unit 104 reads provider connection information from the memory 35 of the radio module 7*a* inserted into the slot 2*a* and stores the same in the memory 106 (S152). Next, display a message urging entry of a password on the display 102 to make the user input the password (S153) and compare the password with a password in the provider connection information stored in the memory 106 (S154). When the passwords fail to coincide with each other, execute error processing and when they coincide with each other, call an access point from the radio module 7*a* using a telephone number in the provider connection information stored in the memory 106 and send user ID and password to connect to the provider (S155). Thereafter, access a home page on the Internet according an URL designated by the user.

Although in the foregoing example, the radio module 7*a* is used, replacement by other radio modules 8*a* and 9*a* enables the other persons to immediately use the Internet. Moreover, not solely from the portable terminal device 1*a*, connection to the Internet can be made from the PDA 1*b* and the PC 1*c* by inserting the modules into their slots.

Although in the foregoing description, connection to the provider is made after waiting for an instruction from a user to start a browser, automatically executing the processing of FIG. 29 immediately after step S125 of FIG. 25 to insert the radio modules 7*a*, 8*a* and 9*a* into the slot of the terminal device realizes an arrangement in which connection to the provider is immediately established.

As described in the foregoing, the present invention attains the following effects.

Replacement of differently colored various communication devices makes it possible to cope with various radio infrastructures and which communication device is currently used is externally checked with extreme ease, with the communication device being inserted into a slot of a terminal device.

Since once data for authentication is registered at a terminal device by a key module of the same configuration as that of a communication device, authentication processing between the communication device and the terminal device is automatically executed without the need of input of a password etc. by a user every time the communication device is inserted, the amount of work done by the user necessary for preventing false use of the communication device by others can be reduced. In addition, since registration needs a key module without fail, it is safer than password input.

In an arrangement in which after authentication is obtained between a terminal device and a communication device, when the communication device is extracted from a slot, the terminal device is locked to accept none of input from a user, the communication device is allowed to have a key function.

With a communication device having a memory for storing information necessary for the connection to a specific provider, connection to a provider of the Internet is enabled immediately after the purchase of the communication device to realize use of the Internet with ease.

Communication device for wireless-connecting terminals which is colored according to its transmission rate makes it possible to externally check which transmission rate a currently used communication device has with extreme ease, with the communication device being inserted into a slot.

According to a method of wireless-connecting a set of communication devices and wireless-connecting terminal devices of the present invention, simple work of inserting communication devices of the same set into a slot of the terminal device enables setting of a communication address and a key for data encryption, thereby realizing wireless-connection among a plurality of terminals with ease.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A method of conducting authentication between a communication device, which can be freely inserted into and extracted from a slot of a terminal device, and said terminal device, comprising:

(a) inserting a key module storing a same ID and authentication code as an ID and an authentication code stored in the communication device, and storing a cryptographic function paired with an inverse cryptographic function stored in the communication device, into the slot to register the ID, the authentication code and the cryptographic function stored in the key module at the terminal device, and (b) when the communication device is inserted into the slot, conducting authentication between the communication device and the terminal device, said step (b) including:

(b-1) collating the ID stored in the communication device and the ID registered at the terminal device, (b-2) when collation of IDs succeeds, generating a random number, sending data obtained by encrypting the random number with the authentication code connected by the cryptographic function from the terminal device to the communication device, and at the communication device, restoring the authentication code and the random number by the inverse cryptographic function to collate the restored authentication code and the stored authentication code, and (b-3) when collation of authentication codes succeeds, sending data obtained by encrypting said restored random number by the inverse cryptographic function from the communication device to the terminal device and at the terminal device, restoring the random number by the cryptographic function to collate the restored random number with said random number generated by the own terminal device.

2. The authentication method as set forth in claim 1, further comprising:

when the communication device is extracted from the slot, after authentication between the terminal device and the communication device is obtained, bringing the terminal device to a locked state where no user input is accepted.

3. The authentication method as set forth in claim 1, further comprising:

when the communication device is extracted from the slot, after authentication between the terminal device and the communication device is obtained, bringing the terminal device to a locked state where no user input is accepted, and when the communication device is inserted into the slot of the locked terminal device to obtain authentication between the terminal device and the communication device, releasing the terminal device from the locked state.

* * * * *